United States Patent
Kirshenbaum

(10) Patent No.: US 8,463,787 B2
(45) Date of Patent: *Jun. 11, 2013

(54) STORING NODES REPRESENTING RESPECTIVE CHUNKS OF FILES IN A DATA STORE

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 44 days.

This patent is subject to a terminal disclaimer.

(21) Appl. No.: 12/911,007

(22) Filed: Oct. 25, 2010

(65) Prior Publication Data

US 2011/0035376 A1      Feb. 10, 2011

Related U.S. Application Data

(63) Continuation of application No. 11/888,092, filed on Jul. 31, 2007, now Pat. No. 7,856,437.

(51) Int. Cl.
G06F 17/30 (2006.01)

(52) U.S. Cl.
USPC .......................................................... 707/737

(58) Field of Classification Search
None
See application file for complete search history.

(56) References Cited

U.S. PATENT DOCUMENTS

| | | | |
|---|---|---|---|
| 5,727,081 A | 3/1998 | Burges | |
| 5,873,097 A | 2/1999 | Harris | |
| 5,970,496 A | 10/1999 | Katzenberger | |
| 6,584,459 B1 | 6/2003 | Chang | |
| 6,654,743 B1 | 11/2003 | Hogg | |
| 6,721,275 B1 | 4/2004 | Rodeheffer | |
| 6,925,470 B1 | 8/2005 | Sangudi | |
| 7,058,644 B2 | 6/2006 | Patchet | |
| 7,062,507 B2 | 6/2006 | Wang | |
| 7,082,505 B2 | 7/2006 | Chen | |
| 7,191,170 B2 * | 3/2007 | Ganguly et al. | 707/741 |
| 7,281,006 B2 | 10/2007 | Hsu | |
| 7,346,734 B2 | 3/2008 | Chen | |
| 7,487,138 B2 * | 2/2009 | Borthakur et al. | 1/1 |
| 7,761,458 B1 * | 7/2010 | Eshghi et al. | 707/755 |
| 7,797,323 B1 * | 9/2010 | Eshghi et al. | 707/737 |
| 7,814,078 B1 | 10/2010 | Forman | |
| 7,831,573 B2 * | 11/2010 | Lillibridge et al. | 707/698 |
| 7,853,552 B2 * | 12/2010 | Beringer et al. | 1/1 |
| 2002/0133491 A1 * | 9/2002 | Sim et al. | 707/10 |
| 2003/0145093 A1 | 7/2003 | Oren | |
| 2005/0091234 A1 | 4/2005 | Hsu | |
| 2005/0097313 A1 | 5/2005 | Bolosky | |
| 2005/0114350 A1 * | 5/2005 | Rose et al. | 707/10 |

(Continued)

OTHER PUBLICATIONS

"Glacier: Highly durable, decentralized storage despite massive correlated failures", Haeberlen et al. , 2005, pp. 1-16, http://www.cis.upenn.edu/~ahae/papers/glacier.pdf.*

(Continued)

*Primary Examiner* — Neveen Abel Jalil
*Assistant Examiner* — Kellye Buckingham

(57) ABSTRACT

To provide a data store, nodes representing respective chunks of files are stored in a predefined structure that defines relationships among the nodes, where the files are divided into the chunks. The nodes are collected into plural groups stored in persistent storage, where some of the nodes are collected into a particular one of the groups according to a locality relationship of the some of the nodes.

19 Claims, 12 Drawing Sheets

U.S. PATENT DOCUMENTS

| | | | |
|---|---|---|---|
| 2005/0144514 A1* | 6/2005 | Ulrich et al. | 714/6 |
| 2006/0020662 A1 | 1/2006 | Robinson | |
| 2006/0059171 A1 | 3/2006 | Borthakur | |
| 2006/0106857 A1 | 5/2006 | Lillibridge | |
| 2006/0155735 A1 | 7/2006 | Traut | |
| 2006/0253476 A1 | 11/2006 | Roth | |
| 2006/0282475 A1* | 12/2006 | Suermondt et al. | 707/201 |
| 2007/0124415 A1 | 5/2007 | Lev-Ran | |
| 2007/0162462 A1 | 7/2007 | Zhang | |
| 2008/0155520 A1* | 6/2008 | Meloche et al. | 717/157 |
| 2009/0037456 A1 | 2/2009 | Kirshenbaum | |
| 2010/0110935 A1* | 5/2010 | Tamassia et al. | 370/256 |
| 2010/0281051 A1* | 11/2010 | Sheffi et al. | 707/770 |

OTHER PUBLICATIONS

"Bigtable: A Distributed Storage System for Structured DAta", Fay Chang et al., 2006, 1-15, http://static.googleusercontent.com/external_content/untrusted_dlcp/labs.google.com/en/us/papers/bigtable-osdi06.pdf.*

"IBM Stoage Tank", IBM, 2002, 1-16, http://www.almaden.ibm.com/cs/storagesystems/stortank/ExtStorageTankPaper01_24_02.pdf.*

A.Z. Broder et al., "Min-Wise Independent Permutations," pp. 1-36 (1998).

K. Eshghi et al., "A Framework for Analyzing and Improving Content-Based Chunking Algorithms," pp. 1-10 (2005).

http://en.wikipedia.org/wiki/Hash_function, definition for hash function, pp. 1-4 (at least as early as Jul. 27, 2006).

U.S. Appl. No. 11/514,634, entitled "Data Structure Representation Using Hash-Based Directed Acyclic Graphs and Related Method," filed Sep. 1, 2006, pp. 1-41, Figs. 1-18.

"Discovering Large Dense Subgraphs in Massive Graphs", David Gibson et al. 2005, pp. 721-732. http://portal.acm.org/citation.cfm?id=I083592.1083676&coll=ACM&dl=ACM&CFID=83256907&CFTOKEN=90756675.

"h-Assignent of Simplical complexes and reverse search", Sonoko Moriyama et al., vol. 154, issue 3, 2006, pp. 594-597 http://www.sciencedirect.com/science?_ob=ArticleURL&_udi=B6TYW-4HDP6VR-2&_user=2502287&_coverDate=03%2FO1%2F2006&_rdoc=1&_fmt=high&_orig=search&_sort=d&_docanchor=&view=c&_searchStrId=1284135091&_rerunOrigin=google&_acct=C0000.

U.S. Appl. No. 11/888,154, Notice of Allowance dated May 30, 2010, pp. 1-13.

U.S. Appl. No. 11/888,154, Non-Final Rejection dated Sep. 3, 2009, pp. 1-16 and attachments.

* cited by examiner

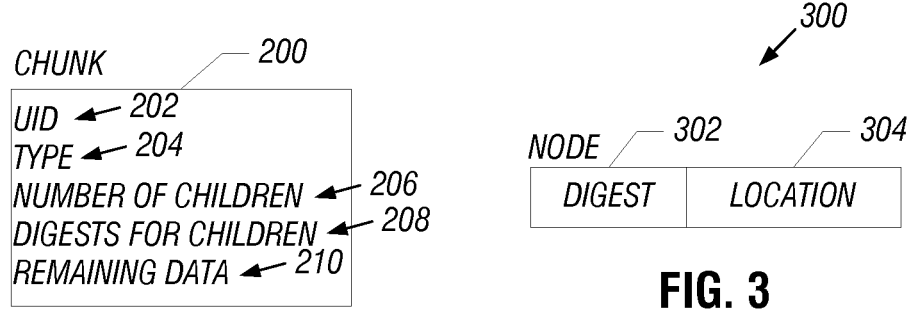
FIG. 2
FIG. 3
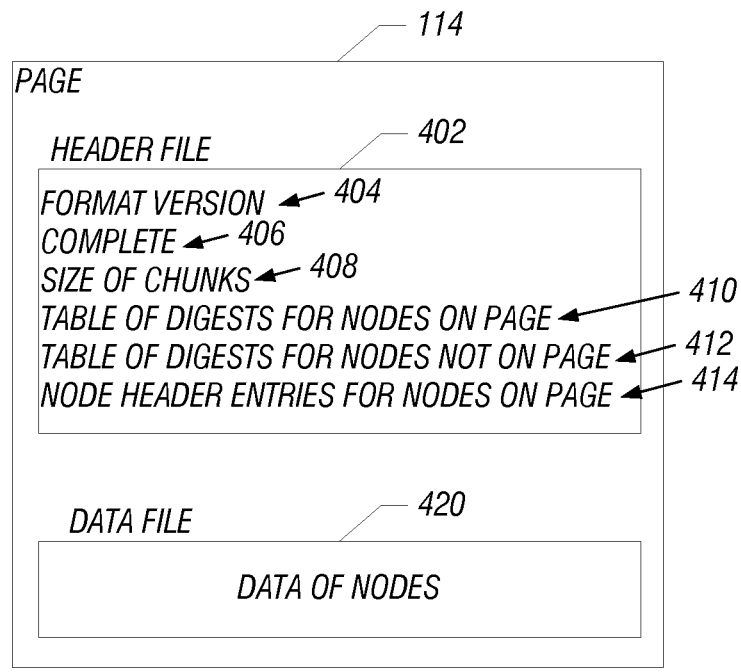
FIG. 4

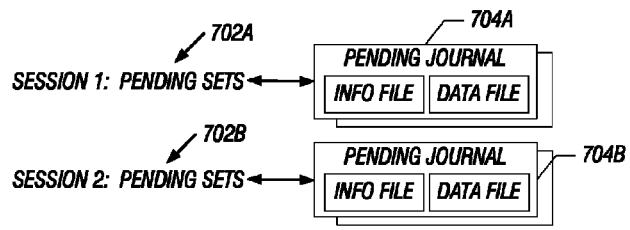
FIG. 7
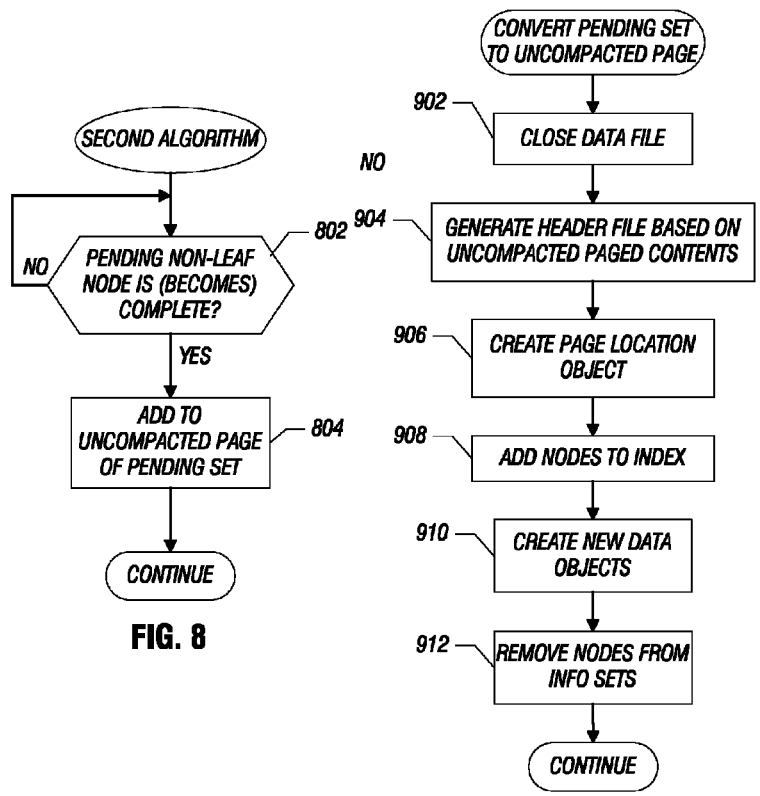
FIG. 8
FIG. 9

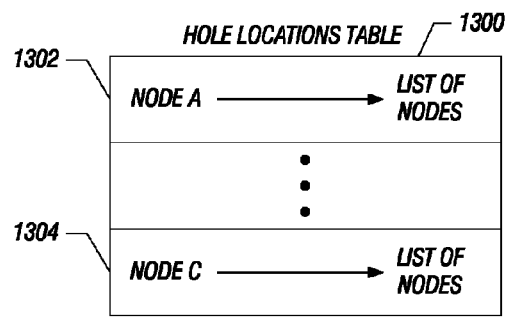
FIG. 13
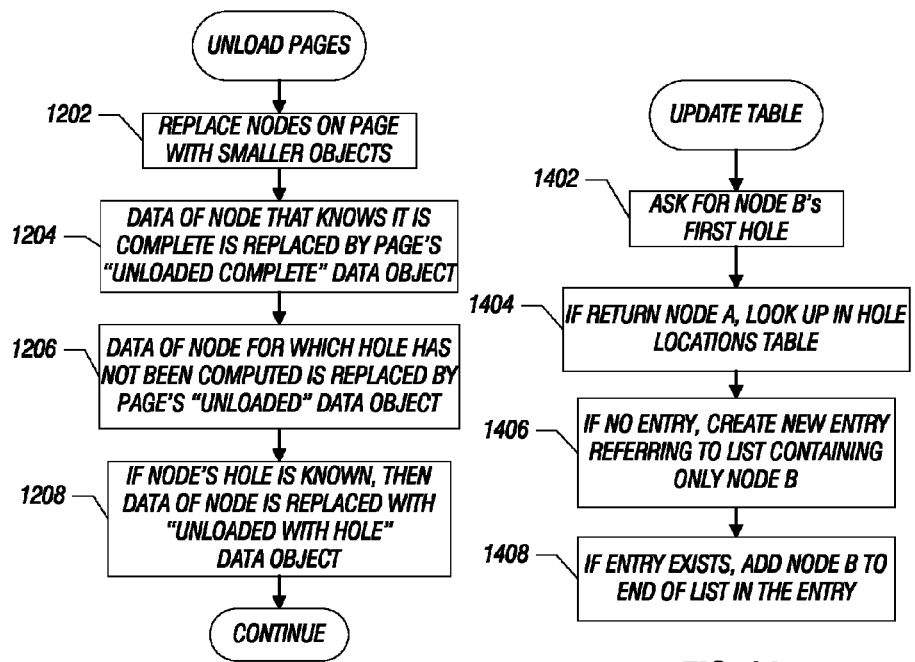
FIG. 12
FIG. 14

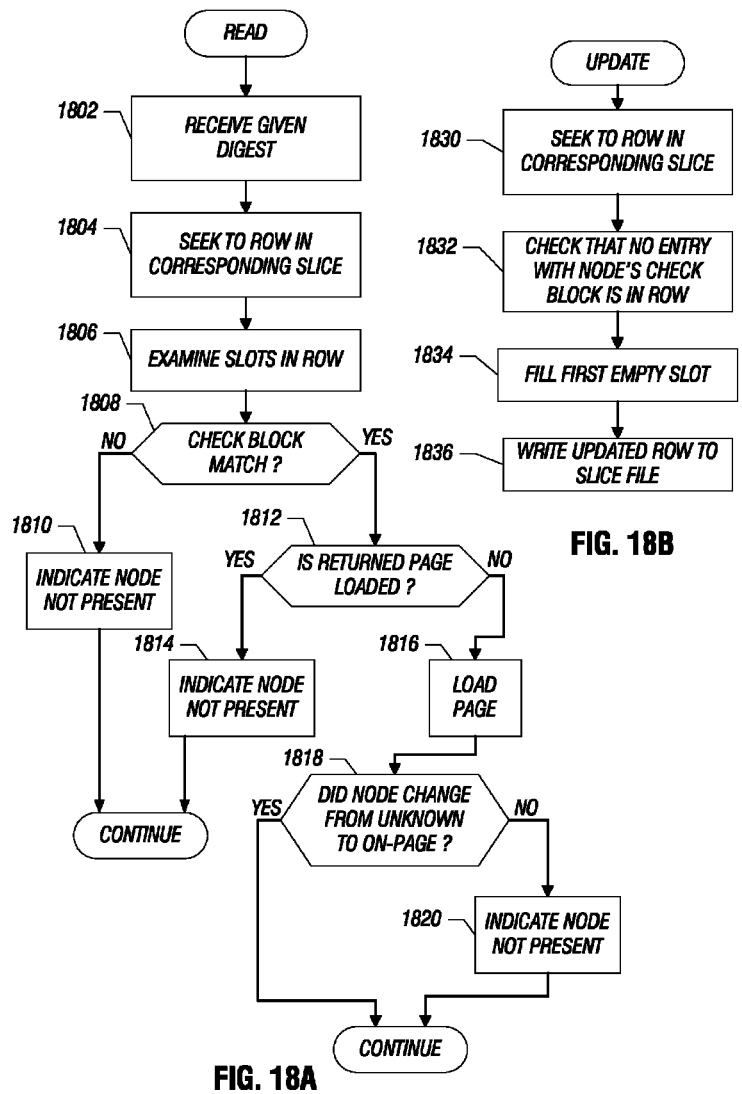

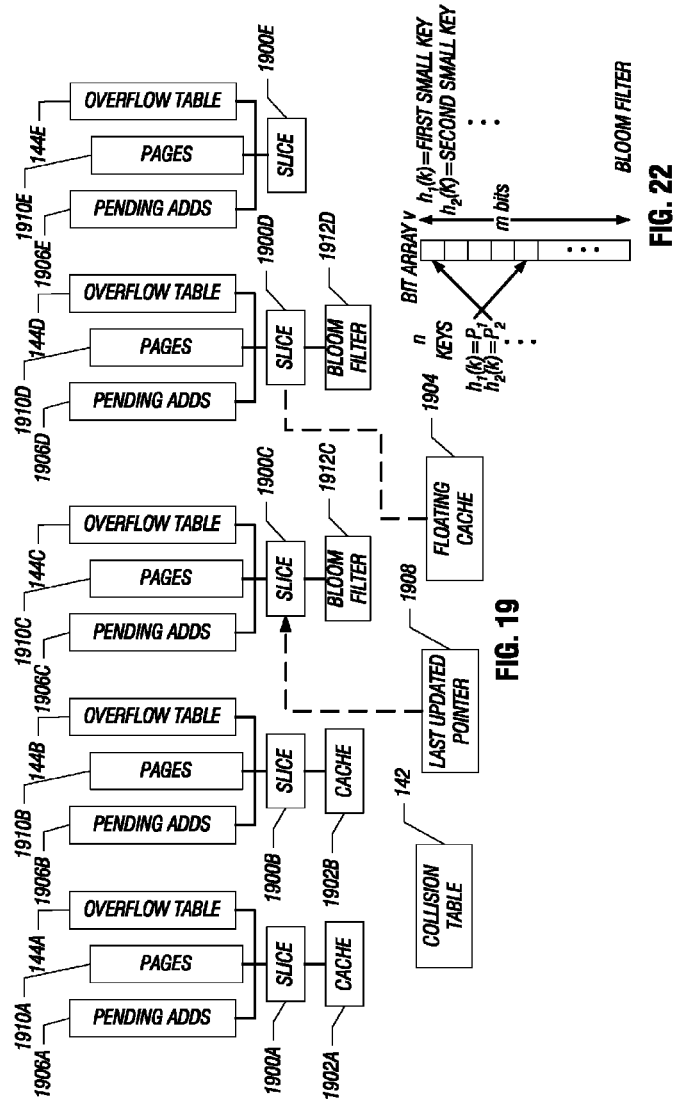

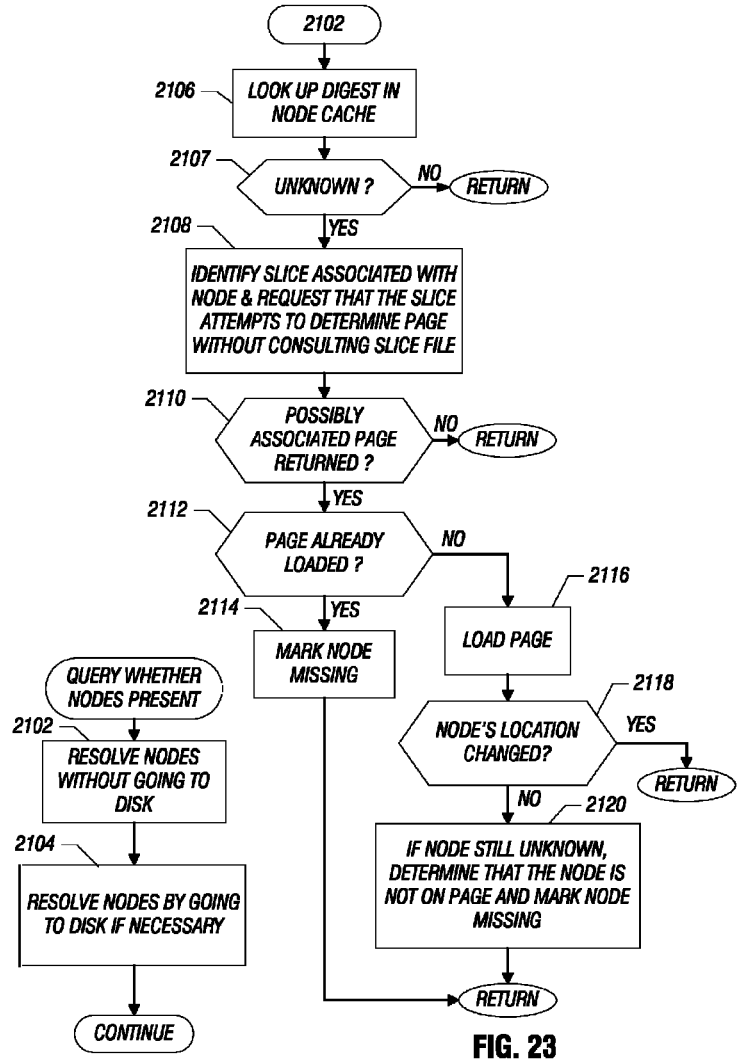

STORING NODES REPRESENTING RESPECTIVE CHUNKS OF FILES IN A DATA STORE

CROSS-REFERENCE TO RELATED APPLICATION

This application is a continuation of U.S. Ser. No. 11/888,092, filed Jul. 31, 2007, now U.S. Pat. No. 7,856,437, entitled "STORING NODES REPRESENTING RESPECTIVE CHUNKS OF FILES IN A DATA STORE," which is hereby incorporated by reference.

BACKGROUND

Various types of data stores can be used, including content-addressable data stores, chunk-based data stores, and distributed file systems. A content-addressable data store is a data store in which retrieval of a data item is based on the content of the data item. A chunk-based data store refers to a data store in which pieces of files, rather than entire files, are stored in the data store.

A challenge faced by the various data store architectures is the ability to efficiently handle large amounts of data, such as for data stored in backup or archiving storage systems, storage systems to store data of a large enterprise, and so forth. An issue associated with certain data-store architectures is that they do not scale very well as the amount of data that has to be stored increases. The inability to scale effectively can lead to reduced data storage system performance or limits on the amount of data that can be stored in the storage system.

BRIEF DESCRIPTION OF THE DRAWINGS

Some embodiments of the invention are described with respect to the following figures:

FIG. 2 illustrates a chunk used in the data store according to an embodiment;

FIG. 3 illustrates a node used in the data store according to an embodiment;

FIG. 4 illustrates a page used the data store according to an embodiment;

FIG. 7 illustrates multiple sessions and associated pending sets and pending journals used in a second algorithm of performing a page write, according to an embodiment;

FIG. 8 is a flow diagram of tasks performed by the second algorithm of performing a page write, according to an embodiment;

FIG. 9 is a flow diagram of converting a pending set to an uncompacted page, according to an embodiment;

FIG. 12 is a flow diagram of unloading a page, according to an embodiment;

FIG. 13 illustrates a hole locations table, according to an embodiment;

FIG. 14 is a flow diagram of updating the hole locations table, according to an embodiment;

FIG. 16 illustrates an example digest and use of a subset of the example digest, where the subset of the example digest is used to look up a node in the index, according to an embodiment;

FIG. 17 illustrates an example index slice file that is part of the index according to an embodiment;

FIG. 18A is a flow diagram of looking up a digest, according to an embodiment;

FIG. 18B is a flow diagram of updating an index slice file, according to an embodiment;

FIG. 19 illustrates the in-memory portion of the index according to an embodiment;

FIG. 21 is a flow diagram of querying whether nodes are present using a slice cache, an overflow table, and a Bloom filter, according to an embodiment;

FIG. 22 illustrates an example Bloom filter used with the index, according to an embodiment; and FIGS. 23-24 are flow diagrams of a procedure for resolving a node without going to permanent storage, according to an embodiment.

DETAILED DESCRIPTION

Figure 1:
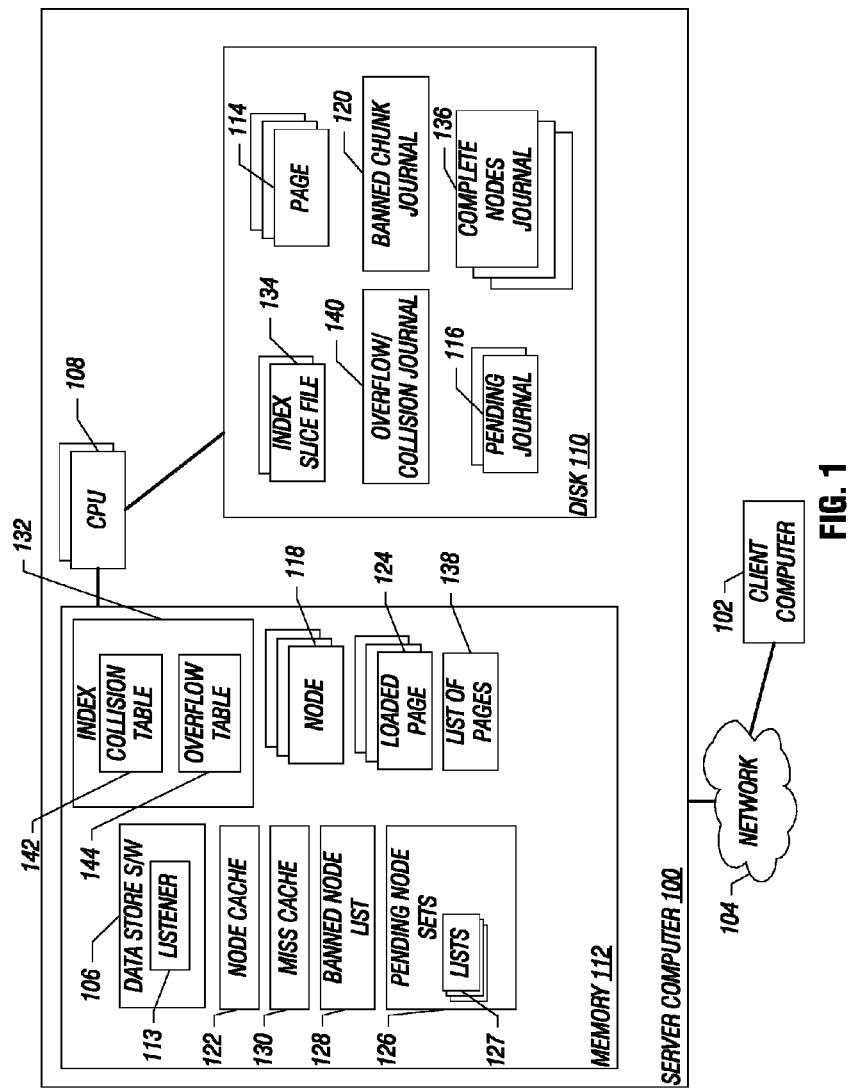
FIG. 1 is a block diagram of an example arrangement that includes a server computer coupled to a client computer and a server computer, where the server computer provides a data store architecture according to an embodiment.

A data store architecture according to some embodiments is a chunk-based data store in which a file is divided into multiple chunks, with the chunks being stored rather than the files. A "file" refers to any element of a file system, which generally refers to any system for organizing data in a data store. Examples of a file include one or more of the following: a document (such as a document produced or edited by a software application), a collection of data, a sequence of data, a program, a database record, or any other grouping of data. A "file" can also refer to a directory, folder, or path in which data is located. A "file" can also refer to one part of a larger file, such as a file collected within an archive, an e-mail message, an attachment of an e-mail message, and so forth.

In some embodiments, the term "chunk" refers to a segment of the file, where the chunk is produced by chunking (dividing) the file based on the content of the file (which may result in chunks of varying sizes). Alternatively, chunking of the file can be based on fixed sizes to divide a file into chunks of roughly equal size. In some embodiments, individual chunks may refer to discontiguous regions of a file, as long as it is possible to recreate the file given a complete set of its chunks. In some embodiments some or all chunks may encompass the entirety of their respective files. The benefit of chunking is that if two files are partially identical (such as when one is an edited or newer version of another), the two files can share many common chunks. The presence of common chunks means that when a second file is stored that contains common chunks with a first file, only the chunks of the second file that are not already present in the data store have to be stored.

A feature of some embodiments of the data store is that the data store is content-addressable, which means that to retrieve a data item (e.g., a chunk), the requester presents a value computed based on the content of the data item. In some embodiments, a cryptographic hash function is used to obtain a cryptographic hash of the content of each data item, which in a chunk-based store is a chunk. The hash function produces a hash value that is computed based on the content of the chunk. Example hash functions that can be employed include the MD-5 (message digest algorithm 5) and SHA (secure hash algorithm) hash functions. The benefit of a content-based data store, especially when used in the chunk-based data store context, is that if the same data item is stored twice (or two data items of identical content are stored), then only a single copy has to be kept, which saves storage space. Also, since the data store can be presented with a hash, the data store can inform the requester (e.g., a client computer) whether the data store has the corresponding data item. If the requester determines that the data store already has the particular data item, then the requester would not have to send over the data item that is already in the data store over a network, which saves network bandwidth.

In some embodiments, another feature of the data store is that it is an HDAG (hash-based directed acyclic graph) data store. In the HDAG data store, the hashes of the chunks that make up a file are themselves collected into an object that is stored in the data store. An HDAG is a directed acyclic graph (DAG) in which pointers hold cryptographic hashes instead of addresses. A cryptographic hash (or more simply "hash") is a small number produced from arbitrarily-sized data by a hash function such that any change to the input data with high probability changes the hash, and given the hash, there is low probability that any two data items will have the same hash.

If the object containing the hashes is large enough, then the object can itself be chunked, and the process can continue recursively. Note that the chunking algorithm for such an object can be different from (or alternatively, it can be the same as) the chunking algorithm on the data. If a data item is in a directory (or folder), the hashes of all of the data items in the directory, along with metadata (e.g., file names, creation and modification timestamps, access control lists) associated with the data items in the directory, are considered as an object to be stored. The result of this is that if a directory hierarchy (say, a machine's file system or a folder along with all of its subfolders and so on recursively) is to be stored, a directed acyclic graph (DAG) of nodes is constructed, where each leaf node of the DAG represents a chunk of a file and each non-leaf node of the DAG points to its children by containing their hashes. There will be a single root node for this DAG. The data store can tell, in response to a query, not only whether the data store has the data item represented by the queried hash, but also whether the data store contains the complete HDAG rooted at the node associated with that hash. (That is, the node associated with that hash and all recursive descendents of that node, including leaf nodes.) So if the requester asks about the root hash and the data store replies that the data store has the complete HDAG rooted there, the requester can safely infer that none of the rest of the graph has to be sent to the data store. If not, the root node is sent and a similar query is made for each of the root's children. By this process, if a small change is made to a large directory structure, the data store can quickly note that the only data items that are to be sent are the actual new or changed chunks and the spine of nodes (spine of nodes refers to a section of the DAG between the new or changed leaf nodes to the root node) leading from the corresponding new or changed leaf nodes to the root node. Similarly if one directory structure is similar to another, only the actual differences and the spines above them have to be sent.

I. Overall Architecture

FIG. 1 shows an example arrangement that includes a server computer 100 that is coupled to a client computer 102 over a data network 104. Note that more than one client computer 102 can be coupled to the server computer 100 over the data network 104.

The server computer 100 (or multiple server computers) implement(s) the data store according to some embodiments. The server computer 100 (or server computers) can also be referred to as a "data storage system." The server computer 100 includes data store software 106 that is executable on one or more central processing units (CPUs) 108 of the server computer 100. The server computer 100 also includes a persistent storage 110 (e.g., magnetic or optical disk-based storage, nonvolatile semiconductor storage, etc.) and a temporary or volatile storage 112 (implemented with volatile memory devices such as dynamic random access memories, static random access memories, and so forth). "Persistent storage" refers to storage which maintains its stored content even if power is removed from a system in which the persistent storage is located. "Temporary storage" or "volatile storage" refers to storage which may lose its stored content if power is removed from the system the temporary or volatile storage is located in.

To implement the data store according to some embodiments, various data structures are contained in the persistent storage 110, while other data structures are provided in the temporary storage 112. As depicted in FIG. 1, one of the data structures stored in the temporary storage 112 is the data store software 106 that can be loaded for execution on the CPU(s) 108. A routine of the data store software 106 is a listener 113, which is used to communicate with the client computer 102 (and with other client computers). The listener 113 listens for incoming requests (write requests, read requests, chuck lookup requests, etc.) from a client computer 102. In one example implementation, the listener 113 listens for incoming requests on a particular port and creates sessions for clients. A session includes a socket and various session configuration information (e.g., client preferences) and client permissions and identification to allow for the server computer 100 to enforce access control. Various basic requests that the client can make of the server computer 100 include the following: (1) store one or more chunks; (2) retrieve one or more chunks; and (3) query whether the data store contains one or more chunks. Other types of requests can also be supported. Generally, to store a chunk, the server computer 100 converts the chunk (received from the client) into a node, and when the server computer 100 is sure that the node will not disappear if the server computer 100 crashes, the server computer returns the hash (in some implementations) of the chunk to the client. To retrieve a chunk, the client provides a digest to the server computer, and the server computer responds with the corresponding chunk or an indication that the server computer does not have the chunk. The client then can also request retrieval of all chunks in the HDAG rooted at a particular node. To query whether the data store contains a chunk, the client provides the hash, and the server computer responds with an indication whether or not the data store has the corresponding chunk. The client can also request that the server provide an indication of whether or not the data store contains a complete DAG rooted at the given node.

The server computer 100 and the client computer 102 communicate by sending and receiving chunks, which represent pieces of files or higher-level nodes in an HDAG. The server computer 100 actually manages nodes of the HDAG, where the nodes represent the chunks and contain enough information to allow the nodes to be transformed into chunks when desired. A chunk is a sequence of bytes, while a node is an object, which may live partially in the persistent storage 110. The nodes of the HDAG are the fundamental objects in the data store. Note that although reference has been made to HDAG, it is noted that in other embodiments, HDAG does not have to be used. In such other embodiments, the nodes can be considered to be part of a predefined structure that defines relationships among the nodes, where the predefined structure can be a tree structure or other type of structure. Note that as used in this document the term "tree" refers to any hierarchical graph structure that can be described by a node and the transitive closure of its children. In particular, unless otherwise specified, the term "tree" refers to directed acyclic graphs (DAGs), hash-based directed acyclic graphs (HDAGs), and general (possibly cyclic) directed graphs.

In one example implementation as depicted in FIG. 2, a chunk 200 contains the following information: an identifier (e.g., in the form of a UID or unique identifier 202) to identify the format of the chunk (in one implementation, all chunks in the data store can have the same UID to indicate an "HDAG chunk"); type information 204 to indicate a type of the chunk (note that the type information is not used by the data store); information 206 indicating a number of children that the node has (which may be zero); a digest 208 for each child of the node, where the digest represents a hash, such as an MD-5 or SHA hash (with the digest including a header identifying the length of the digest and the method of computation of the digest, followed by the contents of the digest); and remaining data (or payload data) 210 of the chunk (note that in this example implementation the length of the data is not encoded in the chunk, but rather, the length is obtained out of band in one example, such as by receiving the overall size of the chunk). Note that the payload data can include the data bytes from the corresponding chunk of the file, where the data bytes can be transformed data such as compressed or encrypted data, or the data bytes can be untransformed data. In some implementations, the digest (hash) is computed over the entirety of the chunk using a hash function. In other implementations, a digest (hash) for the chunk can be computed based on less than the entire content of a chunk. In the ensuing discussion, a "digest" is used interchangeably with "hash."

Any chunk that is less than a predetermined length or whose unique identifier does not identify the chunk as an HDAG chunk is treated as a "blob," which is assumed to have no children. The digest of the blob is computed over its complete content.

In other implementations, the chunk 200 can contain other information.

To prevent against data loss if the server computer 100 should crash, every node that the server computer 100 knows about and whose presence has been asserted to a client (either through a query request, through acknowledgment of a store request, or as being part of a structure whose completeness is queried) is kept in the persistent storage 110, either in a page 114 (from among plural pages 114) or a pending journal 116 (from among plural pending journals) (as depicted in FIG. 1). For improved performance, the server computer 100 keeps objects representing some of the nodes in the temporary storage 112.

In the ensuing discussion, the persistent storage 110 is referred to as "disk," while the temporary storage 112 is referred to as "memory." Also, rather than refer to "server computer" in the following discussion, reference is made to "data store," where "data store" can mean a stored collection of data, or the system (e.g., server computer 100) used to enable storing of data in the data store.

As depicted in FIG. 3, each node 300 is associated with a digest 302 and with a location 304. Note that the node can also include other information, as for example information used to obtain data to recreate the node's associated chunk, information used to select nodes to write to pages, or information used to maintain data structures within the data store. There are various locations in the data store. A "location" refers to a set in the data store. The node can have a location "on page n." What this means is that the data for the node is kept in files representing page n. The in-memory representation of such a node contains references to nodes representing children of this node (if any), as well as, in some cases, information to allow the data store to retrieve other data needed to recreate the chunk off of the corresponding on-disk page 114.

Another location of a node is "pending," which means that the node has not yet been written to a page (114), but the data has been journaled to a file (pending journal 116) for crash recovery. The in-memory representation (118) of such a node contains references to nodes representing children (if any) of this node, as well as the data to reconstitute the chunk and other information used to decide when to write the node to a page 114. In another implementation, memory space can be saved by allowing some pending nodes to refer to their pending journal data files rather than keep chunk data in memory 112.

Another possible location of a node is "missing," which indicates that the node associated with the particular digest is known not to exist in the data store.

Yet another possible location of a node is "banned," which means that the node associated with this digest is known not to exist in the data store and, moreover, the node is not allowed to exist in the data store. Alternatively, a "banned" node can be kept in the data store but will never be retrieved. The data of the node may be associated with information about the entity that banned the node, when the node was banned, and the reason for the node being banned. Information about banned chunks is stored in a banned chunk journal 120 (which is stored on disk 110).

Another location of a node is "unknown," which is a transient indication that the data store does not know whether the node associated with this digest is on a page or is missing (not in the data store). If such a node is asked to resolve, then the index will be asked to look for the node. If the node is not found, the location will be set to "missing."

Another structure that is kept in the memory 112 is a node cache 122 (FIG. 1), which contains references to node objects 118 in memory 112. The node cache 122 is a weak map from digests to nodes. In one implementation, the only way to get a reference to a node (other than by asking an entity who already has the reference) is to ask the node cache 122 to look up a given digest. This ensures that the data store can only contain a single node object for a given digest. Node information will stay in the node cache 122 only as long as some other entity holds a (strong) reference to the nodes, after which point the nodes will disappear from the node cache 122. A "strong" reference is distinguished from a "weak" reference held by the node cache 122, which allows the node to be removed from memory 112 if no other entity has a reference to the node. Examples of strong references include the following: nodes known to have children have references to those children; loaded pages 124 (which are pages that have been loaded from the disk 110 to the memory 112) have references to nodes the loaded pages contain; pending node sets 126 contain references to all pending nodes (where a pending node is a node that has location "pending" as discussed above); a banned node list 128 contains references to all banned nodes (which are nodes that have location "banned" as discussed above); a miss cache 130 contains references to the m nodes most recently discovered to be not in the data store (where m can be some predefined number); an index 132 contains references to nodes on recently-written pages, whose index information has not yet been written to appropriate index slice files 134 on disk 110 (the index 132 and index slice files 134 are described further below); the index 132 (or more specifically a collision table 142 associated with the index) also contains references to nodes with digests that are indistinguishable (by the index) with digests for nodes already in the index; nodes known to have holes (nodes that keep their trees from being complete) have references to one (or perhaps more) of these holes; and the data store may keep other references to nodes, either transiently in its execution or stored in longer-lived variables.

As noted above, nodes are kept on pages 114 on disk 110. Aside from pending nodes, the payload data (chunk data) is kept on the pages 114 on disk 110. As depicted in FIG. 4, each page 114 includes two (or more) files: a header file 402 and a data file 420. The header file 402 of each page 114 contains information about the page as a whole, the digest of the nodes contained on the page, the off-page digests referred to by nodes on the page, the child references for nodes on the page, and information that refers into the data file for reconstituting the chunks. The data file of each page 114 contains the actual data that is not used until a chunk is reconstituted. Thus, the data file of each page 114 is typically larger than the header file.

More specifically, the header file 402 of each page contains the following information, as depicted in FIG. 4: a format version 404 to identify the version of the header file (to allow the layout of the header file 402 to change over time, but still allowing new software to work with old on-disk pages without having to convert these old pages to a new format); a Complete flag 406 to indicate whether all nodes of the page 114 are complete (the completeness of a node is discussed further below); information 408 indicating the size of chunks on the page 114 (to answer the question "How big is the page 114?"); a table of digests 410 for the nodes on the page, in the order the nodes will later come; a table of digests 412 (also referred to as the "external references list") for nodes not on the page that are children of nodes on the page; and a node header entry 414 for each node on the page 114. Each node header entry 414 starts with format information, which encapsulates information that would otherwise take up storage space. For example, since nearly every chunk will start with the same UID, it can be assumed by the format, and therefore, the UID does not have to be stored in the data file. Also, leaf nodes have no children, and therefore there is no reason to take up storage space to say so.

In some implementations, the formats of the data store include: blob, on-disk leaf, header-only leaf, header-only non-leaf, and on-disk non-leaf. The blob format indicates that a data file contains the entirety of the chunk, and the corresponding node header entry 414 in the header file 402 contains the length of the chunk and the offset of the chunk in the data file. The on-disk leaf format indicates that the data file contains a "type" field (204 in FIG. 2) and the chunk data (not including the UID or the zero number of children). The node header entry 414 for the node according to the on-disk leaf format contains the length and offset of this data in the data file 420.

A node according to the header-only leaf format is a special case in which the amount of data is so small that it is not worth keeping both a length and offset in the node header entry 414 for this node, and it is not worth going to the data file 420 to obtain the data when the chunk is to be reconstituted. As a result, the type (and perhaps data) information is kept in the node header entry 414 (with no corresponding entry in the data file 420). This can be used when the data field for the chunk is actually empty (which can be uncommon).

A node according to the header-only non-leaf format is relatively common, and occurs when a non-leaf node contains only type information and child pointers (with the data field of the chunk being empty). The node header entry 414 for a node of the header-only non-leaf format contains the type field (204 in FIG. 2) and a table of children. The table of children includes a number of children, followed by that many child indices, where each child index is an index into the page's table of local (on-page) nodes if the index is non-negative, or into the page's table of external (off-page) nodes if the index is negative. As a special case, since it is often the case that a non-leaf node just above leaves contains a large number of leaf nodes (which do not themselves have children) as children, when the number of children is itself negative, it is taken as meaning that the children are the nodes that follow. For example, if node 7 on a page has −5 as its number of children, then the children are actually nodes 8, 9, 10, 11, and 12 on the page. Other representations can be used in other implementations.

For a node having an on-disk non-leaf format, the type field (204 in FIG. 2) and data are kept in the data file 420, and the node header entry 414 for this node contains the length and offset of this data. As with the header-only non-leaf format, the node header entry also contains a table of children.

For header-only nodes (header-only leaf or header-only non-leaf nodes) the chunks can be reconstituted without having to go to disk 110. By appropriately ordering the nodes (and by preserving locality when writing pages), the data store can save space by compressing the child tables, and can also make it likely that if an entire tree (for example, the HDAG representing a file) is being retrieved, a single contiguous section of the data file can be read in one pass, to improve performance.

A characteristic of a page 114 according to some implementations is that the page is immutable—once a page is written to disk 110, the content of the page (at least its header and data files) will not change.

In accordance with some embodiments, the content of a page is chosen to maximize or enhance locality and completeness. To enhance locality, nodes selected to be in a page are selected to try to maximize or increase the likelihood that a node will be on the same page with its parents, children and siblings, which means that if two nodes represent chunks in the same file, it is likely that they will be on the same page. For example, if a file contains 100 chunks, it is likely that all of the 100 chunks are on one page or at most a few pages. In this manner, locality of nodes is maximized or enhanced in a page.

Because pages are created to have significant locality, the odds are good that by loading a page to create one chunk of a file, the data store will also know about nodes for many other chunks in the same file (perhaps even most other chunks in the same file).

Also another feature of enhancing locality is that nodes corresponding to chunks shared by multiple files are also selected to reside in the same page.

Maximizing or enhancing completeness in a page refers to creating (some or most) pages that contain only nodes that root complete DAGs (whether the complete DAG is all on the same page or not). A complete DAG refers to a DAG tree that is complete (there are no missing nodes in the DAG tree). A DAG tree is a subtree (or subgraph) in the overall DAG tree (graph) representing all nodes of the data store. For a page that contains complete DAGs, the data store knows that any node on the page roots a complete tree, so that the data stored does not have to store completeness information (thereby saving space by not storing unnecessary information) for each node individually within a page that contains only nodes that root complete DAGs.

However, in some embodiments, other pages may have incomplete nodes (in other words, one or more children of the incomplete node is missing from the data store). An example of how this can happen is when nodes are being sent from a client one at a time to a data store, and the data store has not received all nodes. Another example of the cause for an incomplete node is when a client has started storing a DAG tree, but the client is interrupted before the storing can be completed.

When a page contains incomplete nodes (which, since complete nodes are preferentially put on pages with other complete nodes, usually means that the page contains only incomplete nodes) at the time the page is written to disk 110, a complete nodes journal 136 is associated with the page, where the complete nodes journal 136 contains the digests of nodes on the page containing incomplete nodes that are later discovered to be complete (such as when new chunks are received by the data store or as a result of pages being loaded from disk to memory).

In some implementations, pages are numbered randomly. When a page is to be written, the data store rolls a random number (such as by using a random number generator) and checks to see whether a page with that number already exists. If it does, the random number rolling is repeated. The space of page numbers is chosen to be large enough relative to the set of actual pages that this will terminate reasonably quickly. In alternative implementations, pages can be numbered in other ways, such as for example sequentially, as long as some mechanism is used to keep track of page numbers no longer in use. The size of a page number is a configuration parameter that impacts the layout of the index. If a page is deleted, such as because its content has been migrated or collected as garbage, care is taken to ensure that the page number is not reused before all references to that page have been removed from the index.

At any point, the data store contains a set of loaded pages 124 in the memory 112. Loaded pages are the pages that the data store has loaded the header file for and whose nodes the data store therefore knows about. Note that the data file of a page is not loaded into memory 112, just the header file 402. To bound memory use, the data store allows there to be a certain number of nodes due to loaded pages at any given time. (Alternatively, the criterion might be a certain number of loaded pages or some other bound on the amount of memory or other resources consumed due to loaded pages.) When that number is exceeded, a page is selected to be unloaded from memory 112 (unload from memory 112 by removing the in-memory information). To choose the page to unload, the data store maintains a list of pages 138 (FIG. 1), sorted (more or less) by recency of activity. The one or more pages at the end of the list 138 (the least recently used one or more pages) is (are) unloaded from the memory 112.

In a specific example, whenever a digest lookup (performed for a read or write operation of a chunk) determines that a node for the corresponding chunk is on a particular loaded page 124, or the node on the particular loaded page is being converted to a chunk, then the loaded page is marked as "active." If the loaded page was not already active, it is moved (or added) to the head of the list of pages 138. If the list 138 now contains more than a certain (configurable) number, L, of pages the L+1$^{th}$ page (the last active page) is set to be inactive (and subject to unloading later). However, if the inactive page is subsequently used, before being unloaded, the page will be moved to the head of the list 138 and marked active, and another loaded page will be marked inactive.

This marking approach is used to avoid modifying the list of pages 138 after every node lookup. In most cases, it is expected that there is locality in lookups, so if a page is referenced, it is likely that the page is one of the more recently referenced pages, and thus will already be marked active (and therefore one of the first L pages in the list) and no list manipulation has to be performed. However, if the number of pages that there is room for is much greater than the number of pages that are allowed to be marked active, for a page to be unloaded the page will have to have been unused for quite a relatively long amount of time.

When a page is unloaded, each of the nodes the unloaded page contains has its data replaced by a special (shared) object that reflects the fact that the data store knows that the node is on this page, but that the data store has no further information (including child information so that unloaded nodes do not hang onto their children) except for whether or not the node is complete and what its hole is if the node is known to have one. The list of nodes held by the unloaded page is then deleted or allowed to be automatically collected as garbage. The result of this is that the only nodes that will stick around in memory 112 around are those hung onto by other causes, such as being children of other loaded nodes.

Figures 5, 6:
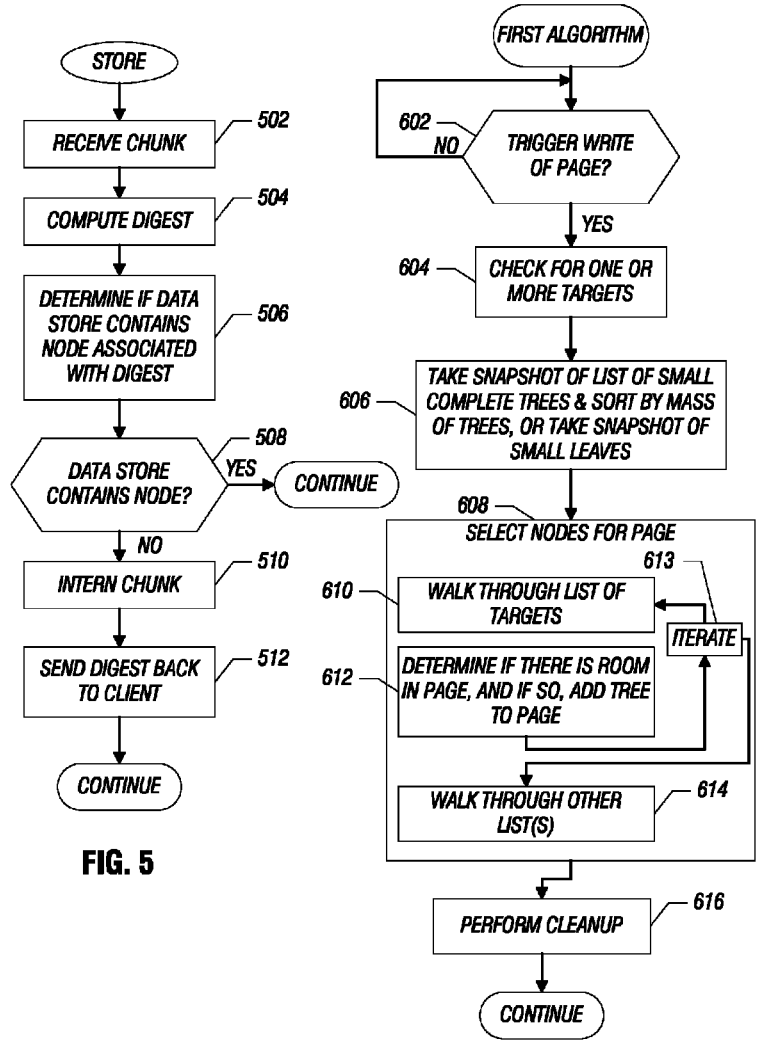
FIG. 5 is a flow diagram of a process of storing a data chunk, according to an embodiment.
FIG. 6 is a flow diagram of a first algorithm of performing a page write, according to an embodiment.

FIG. 5 shows a general process associated with storing a chunk into a data store. The data store receives (at 502) a chunk from a client. Based on the received chunk, the data store computes (at 504) the digest associated with the chunk, by applying a hash function on the entire content of the chunk (or some portion of the chunk). In some embodiments, the digest may be received with the chunk to remove the overhead of computing it if the client is trusted to assert it honestly. The data store next determines (at 506) if the data store contains the node associated with the computed digest (504). This determination is performed by first going to the node cache 122 to find if the computed digest maps to a node in the node cache. If the node is not found in the node cache, then the data store will attempt to find the node associated with the digest using another mechanism, discussed further below.

The data store determines (at 508) if the data store contains the node associated with the computed digest. If so, then the data store indicates that the node is contained in the data store (and may also provide an indication to the requester), and nothing further has to be performed. If the data store does not contain the node, the data store interns (at 510) the chunk, which involves creating a new node in the "pending" location (by adding the node to one of the pending node sets 126 in the memory 112). Data including child references based on the chunk's content is also associated with the new node. Also, as part of the interning process, the chunk and its digest are written out to the active pending journal 116 (corresponding to the pending node set) on disk 110, and the node contains a reference to the journal 116. Writing information relating to a pending node to a pending journal 116 allows for recovery of the pending node in case of a crash of the system containing the data store.

Note that when the active pending journal 116 becomes larger than some configurable bound, the active pending journal 116 is closed and a new pending journal 116 is opened to become the active pending journal. Each pending journal 116 keeps track of the amount of space used by interned chunks as well as the list of the pending nodes themselves.

Once the interning is performed, the computed digest is sent (at 512) from the data store to the requesting client. In some implementations, sending back the digest can be omitted since the client may already have computed the digest. In such embodiments, some other means may be used to acknowledge to the client that the chunk is now in the store. At this point, the store is considered to be completed, since adding the node to the pending journal 116 would allow the store to complete even if the server computer 100 were to crash for whatever reason.

At startup, all pending journals are read into the memory 112, and pending nodes in pending node sets associated with the pending journals are created for any chunks that do not correspond to nodes in the data store (nodes that are resolved to be "missing"). Nodes that are not "missing" may be on a page, in a collision table, in the banned list, or on a previously loaded pending journal. Note that the size of the pending journal would not include the size of any chunks that have been written to a page 114 on disk 110.

When a page is written to disk 110, pending nodes are converted to on-page nodes, and the pending journals the old pending nodes refer to are modified to subtract out the size of the chunks whose nodes are now on the page on disk 110. Moreover, these nodes are removed from the pending node sets 126.

If the size of a particular pending journal 116 falls below some configurable minimum size, the still-pending nodes associated with the pending journal (those that have not been converted to on-page nodes) are moved to the active pending journal (one at a time, which may cause the active pending journal to full up to a maximum level which can cause a new active pending journal to open), and the particular pending journal file is then deleted after all nodes have been moved from the particular pending journal. This allows the data store to reclaim space journaled chunks no longer require for crash recovery. Note that the pending journal files do not have to be read in order to move the chunks; only those nodes still pending are processed, and pending nodes retain their data in memory. Therefore, there is no overhead due to nodes now on pages. In some implementations, the only time the pending journal files are read is at startup.

Since pages often are written in batches, the algorithm discussed above will often have the result that a pending journal 116 will shrink and have its content migrated, only to find that some of the migrated nodes were then written out almost immediately. In order to prevent the unnecessary work of writing out nodes that are about to be written to pages, when a pending journal shrinks sufficiently, rather than immediately migrate its still-pending content, the data store can schedule such a migration for some time in the future (where this time can be configurable). This allows an entire batch of pages to be written out to disk 110 and reduces the amount that has to be moved between pending journals.

II. Page Content Selection

As discussed generally above, nodes written to pages are selected to achieve enhanced locality in each page. To achieve increased locality, a first algorithm for writing nodes to pages can be performed, according to some embodiments. As noted above, when a chunk is received by the data store and the chunk does not correspond to nodes already in the data store, the chunk is interned by creating a node in the "pending" location. The data associated with the pending node contains information about children (if any), holes (if any), as well as data used for reconstituting the chunk.

The data associated with the pending node further contains the following information: a list of complete pending parents of this node (in an implementation where there is typically at most one such parent, this list can be implemented as two references, one to a parent node and one to a list of "more parent nodes"); the "mass" of the node (which is a measure of how much space this node will take up in the data and header files of the page that the node will be written to; and a reference (initially null) to the "on page" node data that will replace this data once the page is written (the reference is created once it is decided to write the node to a page). In one example, the "mass" of a node is the actual number of bytes of the node; in alternative implementations, the mass can be some other units. In one implementation, only the bytes written to the data file are counted, which means that non-leaf nodes with no data have zero mass. The mass is thus a value based (more or less) on the amount of disk space taken up by the node.

For pending nodes that have children, the following information is also further associated with such nodes: the total number of pending nodes in the complete DAG rooted at this node (in one implementation, this is the number with the DAG considered as a tree, where nodes accessible from the node by multiple paths are counted multiple times); and the total mass of pending nodes in the complete DAG rooted at this node (with similar caveat as above).

Note that for the total number of pending nodes and the total mass of pending nodes information associated with a node, only pending nodes are considered, since such nodes are chosen to be written out. Nodes that are already on pages do not contribute to the total number of pending nodes or the total mass.

A page has a configurable minimum and maximum size (in terms of number of nodes and mass). A leaf or complete tree that is bigger than the maximum size is called "large" (large leaf or large tree). A leaf or complete tree that is not large is called small (small leaf or small tree). A small leaf or small tree can fit on a page if the current size of the page plus the mass of the leaf or tree does not exceed the maximum size.

The pending location keeps track of the complete lists (127) of large undominated leaves, small undominated leaves, (roots of) large complete trees, (roots of) small complete trees, and incomplete nodes. In some embodiments, some or all of these lists may be implemented using other data structures, such as sets or hash tables. An "undominated" leaf is a leaf node with no parent currently in the store. When an undominated leaf node is interned, the leaf node is put on the appropriate list (list of large undominated leaves or list of small undominated leaves) based on the size of the leaf node. When an incomplete non-leaf node is interned, the incomplete non-leaf node is placed on the list of incomplete nodes. However, a particular complete non-leaf node when interned or a particular non-leaf node when it becomes complete causes the following tasks to be performed:

1) the non-leaf node is removed from the list of incomplete nodes;
2) the number of pending nodes in the tree of the non-leaf node is set to one more than the number of pending nodes in the pending children (those children that are pending nodes);
3) the mass of the non-leaf node's tree is set to the sum of the masses of the trees rooted in its pending children plus the mass of the non-leaf node;
4) the particular non-leaf node's children are removed from the various lists of the pending node sets to ensure that the lists only contain maximal pending elements (nodes that are undominated);
5) the particular non-leaf node's children are told to add the particular non-leaf node as a complete pending parent; and
6) the particular non-leaf node is added to the large or small complete trees list, based on the mass of the particular non-leaf node's tree.

Periodically, as depicted in FIG. 6, the data store determines (at 602) whether the data store should write out a new page to the disk 110 (FIG. 1) based on whether a trigger has occurred. In some implementations, the triggering event for writing out a new page to disk 110 occurs if any one of the following is true: (1) there is a large leaf node or a large complete tree; or (2) the amount of mass of pending nodes (or the number of pending nodes) is above some configurable threshold, which can be expressed in terms of the number of pages worth of data that is being kept in memory 112.

The actual writing of a page to disk 110 may be delayed until system resources become available, such as when the data store activity slows down, unless certain critical thresholds have been crossed.

If a trigger event indicates that a write of a page is to be performed, as determined at 602, the data store checks (at 604) to see if there are one or more targets, which are one or more nodes the data store will attempt to provide all in one page. If there is a large leaf node, then one of the large leaf nodes (such as the first large leaf node in the list of large leaves in one example) is chosen as a target. Otherwise, if there is a large tree, then the largest small descendants of the large tree are chosen. To choose the largest small descendants of the large tree, the children in the large tree are walked, and any small children are added to a temporary list of targets. Large children in the tree are walked recursively, adding their maximal small descendants to the list of targets. Effectively choosing the largest small descendants refers to choosing subtrees, any of which are small but which have no small parents. If there are no large leaves or large trees, the list of targets will be empty. Otherwise, the list of targets is sorted from largest to smallest according to the mass of each target node's tree.

Next, a snapshot of the list of small complete trees (one of the lists 127 described above) is taken (at 606), and this list of small complete trees is sorted by the mass of each tree. The sorting provides a list of small complete trees sorted from biggest tree (biggest by mass) to smallest tree before anything is written to the page. If there are no small trees, a snapshot of the list of small undominated leaves (another one of the lists 127 discussed above) is taken, preserving the temporal order of arrival.

Next, the nodes that are to be written to the page are selected (at 608). The selection of the nodes includes first walking through (at 610) the list of targets in some predefined order, such as from biggest tree to smallest tree. For each target, the data store determines (at 612) whether there is sufficient room for the tree in the list of targets on the page (note that there is always room for the first tree in the list of targets). If there is sufficient room, the tree is added to the page.

To add a tree to a current page (note that the "tree" added would usually be a subtree of the overall tree), the root node of the tree is added, and for each child of the root node, if the child is currently been written to the page (in other words, it is pending but has a reference to "on-page" data), the data store ignores the child node. Otherwise, if a child is a pending node, the child node is added recursively (as a tree) to the current page. If neither of the above two conditions is true (which means that the child node is not currently being written to a page and is not a pending node), the child node is added to the page's list of external references, which is written to the page's header file.

When a node is added to the current page, the data store adds the node to the page's list of local nodes, writes the data file component (if any) to the page data file being written; and constructs an on-page data object for the node and sets the pending data object to refer to the on-page data object. The data store also tells the node's parent(s) to (recursively) remove the node's tree count and tree mass from the parent(s)'s tree counts and tree mass. Note that this may change a large tree into a small tree and cause it to move from one list to another (to move from the list of large complete trees to the list of small complete trees). Also, the data store clears the node's parent list. Note that since this can be performed in a preorder walk, subsequent calls will only have to go up one level, unless the node's descendants are also in other DAGs. The node is removed from the various lists of trees and leaves (list of large undominated leaves, list of small undominated leaves, list of large complete trees, list of small complete trees, and list of incomplete nodes).

As many of the targets as possible from the list of targets are written to the page. The processes of 610 and 612 are iterated (at 613) for other targets in the list to allow the data store to add as many targets as the data store can add to the current page. Once as many targets as possible are added to the page, the data store next walks (at 614) the other list (the snapshot of the list of small trees or list of small leaves) to see which small trees or small leaves can be added to the current page. The same process as in 610 and 612 can be performed.

Since the list of targets (and if small trees exist, the snapshot of the list of small trees) are sorted from biggest pending tree to smallest pending tree, the data store can start out by putting the largest (small so that it is guaranteed to fit) tree on the page. The data store then puts as many other trees as the data store can until some minimum page size is reached. It may be undesirable to fill the page to the maximum, since that may lead to fragmentation. It may also be desirable to only consider small trees above some minimum size or to only consider trees whose size has been reduced (indicating that they share structure with other trees that have been written to the page).

As discussed above, the list of targets and the snapshot of the list of small trees are sorted before the data store starts writing anything to the page. As nodes are written to the page, however, the masses of the trees may be reduced if they contain as subtrees trees written to the page. When walking these lists, the data store uses the current masses to check to see whether a tree will fit just before the tree is added after other nodes have been added. By performing the check in this way, precedence is given to relatively larger trees that would not fit into a page except for the fact that the relatively larger tree shares nodes that have already been written to the page. This is how locality among DAGs that have more than a single root is accomplished, such as in scenarios where there are overlapping files or similar directory hierarchies.

After the entire list of targets and (if any) list of small trees have been walked through, and any trees that will fit at this point have been added, the data store performs (at 616) cleanup operations, which involve closing the page's data file, writing the page's header file to disk 110, adding a permanent indication (stored on disk) that the page has not yet been completely indexed (permanent indications are discussed further below in Section IV), changing the page's nodes to use their on-page data as the data (alternatively, the page can be marked as unloaded to change the nodes of the page to use the page's "unloaded incomplete" data object for their data, which will force a page load if the nodes are accessed), remove the nodes from their old pending journals 116, and inform the index to add the page's nodes.

With the technique above of writing out a new page to disk, locality is enhanced by attempting to find the biggest (or bigger) trees that will fit on a page, or if no such biggest (or bigger) trees exist, attempting to find the largest small descendents of the tree that fit on a page. In this manner, a larger number of nodes from the same tree are provided onto the same page, so that in a subsequent access, if a particular node is on a given page, there is a relatively good likelihood that the children or descendents of the node are also on the given page. Locality is enhanced also by encouraging trees that share a relatively large number of nodes to be provided on the same page.

In certain scenarios, especially when the data store is busy, performing the first algorithm discussed above to achieve locality may not be practical. As new chunks are received by the data store, such chunks are written to pending journals (116 in FIG. 1) and then (when a page fills or there is too much pending mass), the node data associated with these new chunks are written out again to pages. When a relatively large amount of new chunks is received in a relatively short time period by the data store, the maximum ingest rate of the data store can be half the disk write rate (the rate at which a write can occur to the disk 110), since data has to be written out twice (once to a pending journal and once to a page on disk).

In some embodiments, to avoid or reduce the issue of the data store being unable to ingest new chunks (sent by one or more client computers) at a sufficiently high rate, the first algorithm of writing new pages as discussed above can be postponed until the data store is in a more quiescent state (less busy). In this manner, the data store is allowed to have pages with a little bit less locality for some amount of time until the first page writing algorithm discussed above is performed.

Thus, generally, the first page write algorithm discussed above is delayed until the data store achieves some quiescent state. Instead of performing the first page write algorithm as new chunks are received, a second page write algorithm can be used in some embodiments that provides some level of locality based on the temporal order of chunks received from a client. This locality can be improved upon by performing the first page write algorithm at a later time.

For the second page write algorithm, instead of having just one pending location, multiple pending locations (also referred to as pending sets) are defined. At any given time, a session will be associated with one pending set (its "active pending set", to which information about incoming chunks will be added), but as these fill and are closed, the active pending sets are replaced (as "active") with newly-created pending sets. Each of the pending locations (pending sets) is associated with a corresponding pending journal, with each pending journal split into two files: a data file and an info file. This relationship is depicted in FIG. 7, where multiple sessions 1, 2, and so forth are depicted, with each session established between the data store and a corresponding client being associated with corresponding pending locations 702A, 702B. Thus, as depicted in FIG. 7, session 1 is associated with pending locations (pending sets) 702A, session 2 is associated with pending locations (pending sets) 702B, and so forth. Moreover, each pending location 702A, 702B is associated with a corresponding pending journal 704A, 704B, respectively. Each pending journal has a data file and an info file. Note that the pending journal (704A or 704B) used in the second algorithm is different from the pending journal 116 used with the first algorithm.

In an alternative implementation, pending sets may be organized differently, in that the pending sets can be aggregated into a collection object (referred to as a "pending set collection"). The pending set collection is aware which of its subsidiary pending sets is active. Either of the levels "pending set" or "pending set collection" can be considered a "location" from the point of view of the node in the location. If the pending set collection is the location, then the nodes will have to further keep track of which pending set the nodes are in.

The data file of the pending journal 704 (704A or 704B) contains the same information, and in the same format, as a page's data file (420 in FIG. 4). This data file of the pending journal 704 can be used as the corresponding page's data file when a new page is written to disk according to the second page write algorithm. Note that the pending journal's data file can become a page data file simply by renaming the data file.

Such a page is referred to as an uncompacted page. In an alternative embodiment, the format may be different and the resulting page's header file may have an indication to allow the store to understand and make use of the different format when the uncompacted page is loaded.

The info file contains, for each node associated with a corresponding pending location, information similar to what is contained in the header file (402 in FIG. 4) of a page. In one example, the info file contains the digest of the node, the offset and length of data in the corresponding data file of the pending journal 704, the number of children of the node, the digests of the node's children, and data associated with non-leaf nodes. In some examples, the info file can also contain a header byte similar to the one found in the page's header file. In some implementations, the info file differs from the page's header file in that the latter is designed to be written once, while the former is intended to be created incrementally (by appending) as new nodes are added to the pending set.

The second algorithm allows for non-leaf nodes to be placed close to nodes that the non-leaf nodes dominate, which results from the procedure performed when non-leaf nodes are found to be complete (as discussed below).

Each session may be associated with "current" pending sets which are locations that incoming chunks for that session will be interned in. When the pending sets become big enough, the pending sets will be replaced (as "current") by newly created pending sets.

When new leaf chunks are received by the data store, the new leaf chunks are journaled to the two files referred to above, a data file and an info file. In one implementation, to further speed up performance of the data store, flushes from the data and info files are delayed until just before a result is returned to the client. Also, pending nodes no longer hold onto their respective data, since the data will be read from the data file if applicable. The pending node would thus merely hold the offset and length of the data in the respective journal data file.

When non-leaf chunks are received by the data store from a client, the information of the non-leaf chunks are written only to the info file (and not to the data file).

The journal info file and header file are on-disk files. In memory 112, each pending set has associated with it two sets of nodes, with the first set being an uncompacted page contents set that contains data for the uncompacted page that the pending set will (may) become. Initially, the uncompacted page contents set will contain all of the leaves in the pending set. The second set is the info set, including all still-pending nodes whose information is recorded in the pending set's info file. This info set will initially contain all of the nodes in the pending set. The uncompact page contents set and the info set both reside in memory 112.

Referring to FIG. 8, when a pending non-leaf node is (or becomes) complete, as detected at 802, the data store adds the non-leaf node to the uncompacted page of some pending set (perhaps the same one the pending non-leaf node is currently associated with). To figure to which uncompacted page the pending non-leaf node should go, the data store looks at all of the non-leaf node's children. Since the non-leaf node is (or has become) complete, all of the node's children are also complete, so that any pending children are (or can be made to be) added to some uncompacted page. The data store then picks one of the uncompacted pages (associated with the pending children) to add the pending non-leaf node to (at 804).

The goal of the above procedure is to build up as much superstructure as the data store can above the leaves on an uncompacted page, where the superstructure refers to parent, grandparent, and so forth, of the leaf nodes on the uncompacted page. To pick an uncompacted page from plural potential uncompacted pages, a total order among the pending sets can be defined, where the order can be arbitrary, or the order can be according to the order in which pending sets will be converted to uncompacted pages. The order has to be stable throughout a single execution of the data store, but the order does not have to be the same if the data store is stopped and restarted. With such an ordering, a non-leaf node that is (or becomes) complete can be assigned to the maximum (or greatest) pending set of the pending children of the node, in one embodiment.

In the special case in which a complete non-leaf node does not have any pending children (in other words, all of the node's children are on pages on disk), the data store can proceed in one of several ways. The data store can simply hold off on writing complete non-leaf nodes that do not have any pending children to an uncompacted page. Alternatively, the data store can associate the complete non-leaf node with an arbitrary uncompacted page (perhaps the uncompacted page for the pending set that the complete non-leaf node is already in). As yet another alternative, the data store can hold off until one of the complete non-leaf node's parents is assigned to an uncompacted page, which means that when a node is moved to an uncompacted page, the data store then does a second pass on the node's children, and any pending child nodes not already in an uncompacted page are moved to the same page as the parent node.

When a non-leaf node is moved to an uncompacted page, if the non-leaf node has data, the data is written out to the pending set's data file and the offset and length are noted. In-memory references to the data can then be discarded and the space it consumes can be collected as garbage (unless other references to it exist).

The procedure according to the second algorithm discussed above builds up pages that have locality based on the temporal order of leaf nodes received from a single client (or over a single socket). This will likely result in a relatively good amount of locality, but not as good as the locality resulting from the first algorithm. The node data may also not be in the optimal order for reconstituting chunks for an entire file. Relatively good locality is achieved since non-leaf nodes will be attached to the same uncompacted pages as at least some of their children or parents.

If the data store crashes or is shut down, on restart the data store only has to reread the info files for various pending sets that remain. This will cause the data store to move complete non-leaf nodes again, perhaps to different uncompacted pages, which may involve writing out the data a second time. However, this should not be an issue other than wasting a small amount of disk space. If it is undesirable to waste a small amount of disk space, the moves of complete non-leaf nodes can be journaled on disk, but this approach likely will not be worth the extra disk writes and seeks involved. In such an embodiment, prior to moving complete non-leaf nodes, the data store will do lookups to determine whether the nodes have already been written out to uncompacted pages. As with the first algorithm, when the info files are read on start-up, the store checks to see whether the node already exists in the store before creating a pending node.

Since with the second algorithm pending nodes are no longer holding onto actual node data (for leaf nodes at least), the data store should be able to hold a much larger number of pending nodes in memory. But if the ingest rate is great, at some point, the data store will decide that the data store should convert a pending set to a true uncompacted page.

As depicted in FIG. 9, to perform such conversion, the data file of the pending set is first closed (at 902). The data file is now complete, and no further nodes are allowed to be added to the uncompacted page. Next, a header file is generated (at 904) based on the uncompacted page contents set (in memory 112) associated with the pending set, which may involve doing a topological sort on the nodes to ensure that the header file is written out in an optimal order (in some implementations). Next, a page location object is created (at 906). This page location object knows that it refers to an uncompacted page, and an indication of this fact is written to the page header file as well. The nodes of the uncompacted page are added to the index (at 908), and also, a permanent indication is added to indicate that the page should be indexed.

The nodes are then moved to the new uncompacted page by creating (at 910) new data objects. Alternatively, the new page can be created as an unloaded page and the new page is associated with unloaded (complete) page data objects. This will force a page load if the data store attempts to retrieve the data.

The nodes associated with the uncompacted page are removed (at 912) from the information sets that the nodes currently reside in.

So far, the data store has not done anything with the info file associated with the pending set that was converted to an uncompacted page. This is because there may be non-leaf information in the info file that has not yet been written to an uncompacted page (all the leaf information is on the uncompacted page that was just created according to FIG. 9). As a background task, when the system is quiescent, the info files can be compressed. A new pending set can be created, where the new pending set has an info set and an uncompacted page contents set page. The data store walks through all the pending sets that have been converted to uncompacted pages. For any non-leaf node that is still in the info set of one of the pending sets that have been converted, the node is moved to the info set of the newly created pending set, and the information from the info set is written out to the info file of this newly created pending set. The old pending sets and their info files can then be deleted after such information has been moved.

For pending sets that have not yet been converted, non-leaf nodes can also be moved from such pending sets to a new pending set. However, the leaf nodes have to remain in the info file for the old pending set so that leaf chunks can be reconstituted if the data store has to perform reconstitution. The leaf node information can be written out from the info set for the old pending set to a new file, and when the data store is sure the information has been written out to the new file, the new file can be renamed to be the info file. The non-leaf nodes can also be written to this new file, but only if the number of nodes has shrunk because of non-leaf nodes being added to other uncompacted pages. In this way, when a pending set is converted to an uncompacted page, there will not be anything left in its info set and the info file can be deleted immediately. Also, the rewriting of the info file will have to occur just once, since after having performed the rewriting once, the info file will contain information only for leaf nodes.

Alternatively, for either converted or not-yet-converted pending sets whose info sets have shrunk, a new info file can be generated in the manner described above for leaf nodes on not-yet-converted pending sets. If the info set becomes empty, the info file can simply be deleted.

With the second algorithm discussed above, the data store can ingest new chunks at a rate bounded by the full disk write speed, since the data is only written out once (to the pending set's data file, which will become an uncompacted page).

However, the locality achieved with the second algorithm is usually not as good as the locality that can be achieved by the first algorithm. As a background task, when the data store is quiescent (such as when there are no clients connected to the data store), the data store can apply the first algorithm to convert uncompacted pages into normal compacted pages.

Figure 10:
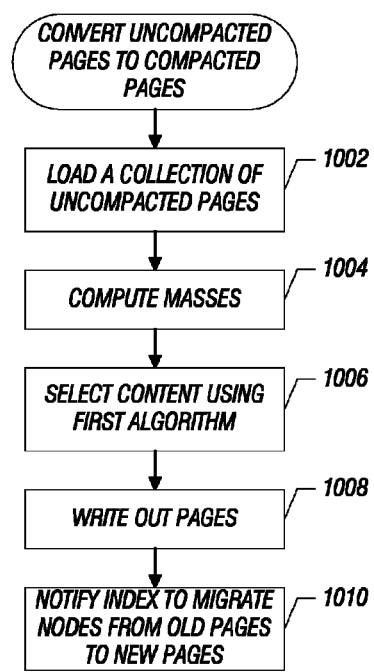
FIG. 10 is a flow diagram of converting uncompacted pages to compacted pages, according to an embodiment.

To perform such conversion, as depicted in FIG. 10, the data store first loads (at 1002) a collection of uncompacted pages from disk to memory. The data store then computes (at 1004) the masses for the nodes of these loaded pages, as well as for any pending nodes, and selects (at 1006) page content using the first algorithm. The pages are then written out and the index is told to migrate the nodes from their old pages to the new pages. What this means is that when the index updates its rows, the index expects to see entries pointing to the old associated pages and the index replaces these old pages rather than add new pages. When the data store gets to a point at which there is not enough mass left for creating a compacted page, the data store can write out new uncompacted pages.

Note that when the second algorithm is used, an extra read (in addition to the two writes associated with the first algorithm) occurs. However, this extra read is performed when the data store is in a less busy state and thus the extra read may not impose too heavy a burden.

III. Completeness Tracking

A task performed by the data store according to some embodiments is completeness tracking, in which the data store is able to answer the question of whether a node contains the entire HDAG rooted at that node. This is useful information since if the data store can determine that it contains the entire HDAG rooted at a particular node, then a client that is sending over a complicated structure (representing, for example, a file or directory structure) does not even have to query the store about anything below that node, let alone send the structure below that node. Indeed, with suitable caching on the client's side, the client may not even have to compute the entire HDAG.

To compute completeness, the notion of holes is provided by the data store. A hole is a node that is either known to be not in the data store or, at least, not known to be in the data store, and which has been determined to be inside the HDAG rooted at some node known to be in the data store. To answer the question of whether a node is complete (in other words, a complete HDAG is rooted at that node in the data store), the node is asked to return a hole contained in the HDAG rooted at that node. If the hole returned is null, this indications that there is no hole, and that therefore, the node roots a complete HDAG.

One or more methods (software routines) can be defined to determine if a node is complete, such as an isComplete( ) method, or to identify the first hole of a node, e.g., a findFirstHole( ) method. Each method can be associated with a Boolean "be sure" parameter. If the "be sure" parameter is true, then the data store goes to disk, if the data store has to in order to be sure of the answer. However, if the "be sure" parameter is false, then the data store does the best it can with the information the data store has in memory. The data store in the latter case may produce false negatives, but no false positives. In other words, if the "be sure" parameter is false, then if the data store answers that the node is complete, the data store will be correct. However, if the data store says "no," the data store may be wrong. Setting the "be sure" parameter to false allows for a quick and dirty check in certain scenarios to improve data store response times.

In other implementations, other gradations are also possible, such as by specifying time budgets for either the isComplete( ) method or the findFirstHole( ) method before the method is to give up. In yet another implementation, probabilistic checking values can be used to reflect the fact that for some situations, it is better to be incorrectly told that more data should be sent rather than waiting a long time to decide that sending of the data can be avoided.

Each node object in memory knows its first hole (which may be null). However, this does not necessarily mean that the node object holds a reference to a hole object, such as in the following scenarios. The following nodes do not have to hold a reference to a hole. Leaf nodes (those without children) cannot have holes and so leaf nodes do not have to waste space by having a reference to a hole object. "Missing nodes" are their own holes, so that a reference does not have to be provided in such nodes. "Unknown" nodes return themselves unless they are asked to be sure, in which case they first resolve themselves to some other type of node, and then ask themselves again. Nodes on pages that have the property that all of the nodes on the page are complete know that they have no holes. Nodes only seen on an external references list when loading pages all of whose nodes are complete have data indicating that they are "unknown," but are known to be complete. Nodes on non-all-complete pages may have been found to be complete previously and flagged such that they are marked complete when the page is loaded.

In some implementations, the distinction between nodes that are known to be complete and nodes that are not known to be complete can often indicated by the choice of the class of the data object associated with the node. For example, for non-leaf nodes on pages known to be complete when the page loads, such non-leaf nodes can be assigned to a first class of data objects, referenced as "class 1." However, for other non-leaf nodes on pages, the non-leaf nodes will be according to another class, referred to as "class 2." A non-leaf node according to class 2 has a reference to a hole and logic for finding the hole. On the other hand, a non-leaf node according to class 1 does not have a reference to a hole object. Thus, by associating a node with class 1, memory space can be saved by avoiding having to include a reference to a hole object.

Most other nodes (according to other classes, for example) have a reference to their hole (or lack of hole). In some cases, the hole will be determined when the node's data object is created (or shortly thereafter). In other cases, the hole reference will take as an initial value a distinguished "not computed" object, and the actual hole will be determined the first time the node is asked for one. Once the hole has been computed, the hole reference is saved and can be returned immediately the next time the node is asked.

To find the hole for a non-leaf node, it is sufficient to ask each of the children of the non-leaf node, passing in the same "be sure" parameter value. If any of the children returns a hole, that is also a hole for the node itself, and the further children do not have to be asked. If none of the children return a hole, then the node itself has no holes and can remember that fact.

As discussed further below, a hole referred to by a node may not be the actual hole, as the data store may later have received that node, but that node may have a hole in it, so when asked for its hole, the node asks the hole for its hole (and caches the result in some implementations). Eventually, this process will bottom-out at a node that returns itself as the hole.

Figure 11:
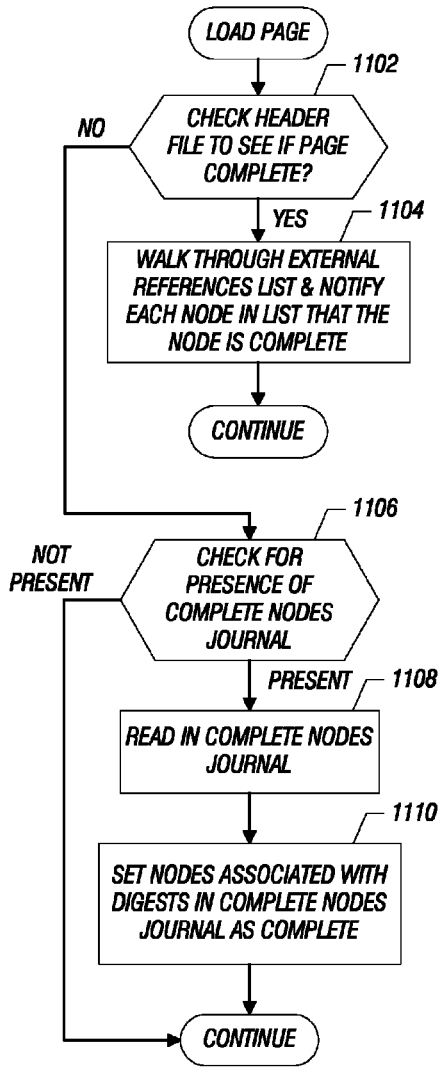
FIG. 11 is a flow diagram of loading a page, according to an embodiment.

Referring to FIG. 11, when a page is loaded from disk to memory (which means that the header file of the page is loaded into memory), the data store checks (at 1102) the header file to determine if the header file indicates whether it is known that all of the nodes on the page are complete. As discussed above, care is taken that this be the case as often as possible. If the header file indicates that all nodes on the page are complete, then the data associated with the nodes is of a class (class 1) that indicates that the node is complete. If all of the nodes on a page are complete, then so are all of the nodes pointed to by the nodes on the page, so all of the nodes on the external references list in the page's header file are also complete. The data store walks (at 1104) this external references list and notifies each of the nodes on the external references list that they are complete. If a node on the external references list already knows that it is complete, then the node does nothing; but if not, the data store has gained information.

If a node on the external references list is "unknown," its data is replaced by a distinguished "unknown complete" object. If the node's hole is not yet computed, it is noted to be null. If the node's hole is known, that hole is told that it is complete. If the node is on a page, the node's digest is provided to the page's complete nodes journal 136 (FIG. 1). This process may cause further cascading, as discussed further below.

If the page is not "all complete," as determined at 1102, the data store checks (at 1106) for presence of a complete nodes journal 136. If one exists, the complete nodes journal is read (at 1108) into memory, and the nodes associated with each of the digests in the complete nodes journal is set (at 1110) as complete. The process at 1108 and 1110 occurs before the node header entries are read so that when the node header entries are read, the data store already knows that some of the nodes are complete, and thus the node data should be created in more compact form (e.g., class 1) that does not refer to a hole.

FIG. 12 shows a process that occurs when a page is unloaded (moved from memory back to disk). Each of the nodes on the unloaded page is replaced (at 1202) by a smaller object that reflects both the fact that the node is on that page (in other words, the information can be brought back by reloading the page), and the node's completeness status.

If a node on a page being unloaded is known to be complete, its data is replaced (at 1204) with the page's distinguished "unloaded complete" data object. Nodes with this data object know that they are complete. If the node's hole has not yet been computed, the data is replaced by the page's distinguished "unloaded" data object (at 1206). This object returns itself as a hole, unless it is told to be sure. If told to be sure, the object first loads the page (thereby changing the data to something other than an "unloaded" data object) and asks the node again. If the node's hole is known to be a real hole, the data is replaced (at 1208) with a new "unloaded with hole" data object, and the node remembers what the hole was.

FIG. 14 shows a process of filling holes. When new nodes are received by the data store, such new nodes may cause other nodes to become complete. To handle this, a hole locations table 1300 (FIG. 13) is maintained, which is a weak map from first nodes to lists of weak references to nodes for which the first nodes are known to be holes.

FIG. 13 shows two entries 1302 and 1304 of the hole locations table 1300. In the first entry 1302, node A (a hole node) is mapped to a list of nodes that node A is known to be a hole for. In the second entry 1304, node C is mapped to another list of nodes that node C is a hole for.

Nodes that consider themselves their own holes are not put into the hole locations table 1300. Weak references are used since, just because the data store knows that node A is a hole for node B, that does not mean that the data store wants to keep node B around in memory. Using a weak map allows for the following example situation: if all the nodes for which node A is a hole have disappeared from memory, then there is no point in holding onto node A (which would keep it in the node cache). By using a weak map, when the last reference to node A disappears, the entry 1302 in the hole locations table 1300 will automatically disappear as well.

In the above example, as shown in FIG. 14, if the data store asks (at 1402) for node B's first hole and finds that it is node A, the data store looks up (at 1404) node A in the hole locations table 1300. If there is no entry for node A, a new entry is created (at 1406), referring to a list containing just node B at this point. However, if an entry for node A already exists, then node B is added (at 1408) to the list it refers to.

Figures 15, 20:
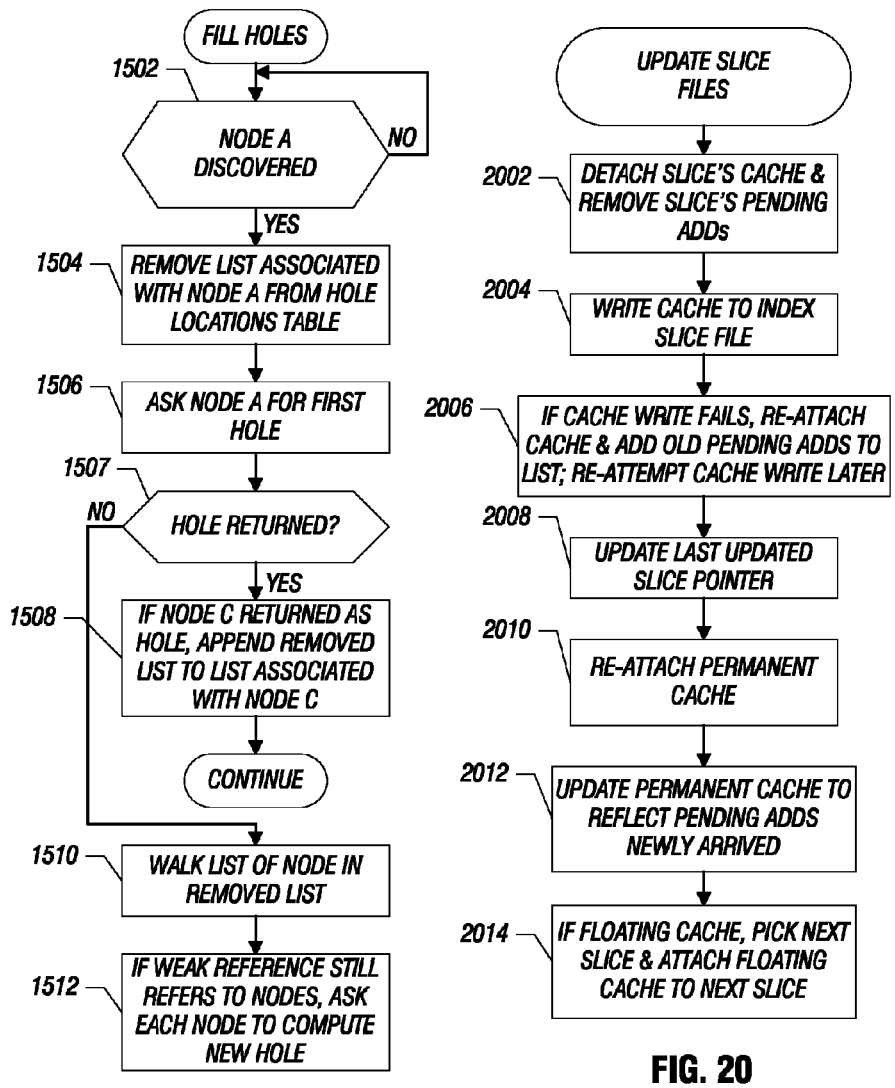
FIG. 15 is a flow diagram of filling holes, according to an embodiment.
FIG. 20 is a flow diagram of updating slice files using a slice cache, according to an embodiment.

Referring to FIG. 15, when a client stores a chunk corresponding to node A (or the data store discovers node A when loading a page), as determined at 1502, the data store removes the list (at 1504) associated with node A from the hole locations table 1300. Note that if there is no list for node A in the hole locations table (which will almost always be the case), then the process is done.

The data store then asks (at 1506) node A for its first hole. If node A returns a hole, as determined at 1507, referred to as node C, then the list that has been removed (at 1504) is appended (at 1508) to the list in the hole locations table 1300 associated with node C (entry 1304 in the example of FIG. 13). If node C did not previously have an entry in the table, it is associated with the list that had previously been associated with node A. Note that the data store does not actually go to all of the nodes in the removed list that has been appended to the end of the list associated with node C to inform them that node C is now their hole (note that these nodes associated with the removed list still think that node A is their hole).

When the nodes on the removed list (that have been appended to the list associated with node C) are asked for their holes, they will forward the request to node A, which will then forward the request to node C, which will return itself. When this information is returned, the nodes that asked for their holes may remember that the answer is now node C (in other words, node C is now their hole instead of node A). Note that since most of the time a node is not asked for its hole, it is not worth expending the effort to update the nodes until such nodes are actually asked.

If no hole is returned at 1507, which means that node A does not have a hole, the data store walks (at 1510) the removed list of nodes, and checks to make sure that the weak references still refer to nodes, and for each that does, asking such node to recompute a new hole (by asking the children for their holes). This will either result in a new hole being found and a node being put on a new list in the hole locations table 1300, or the data store deciding that the node itself is now complete. In the case in which a node is a "unloaded with a hole" object, its data is simply replaced by the page's "unloaded" data object, since the data store does not know that it is complete and it is not worth the effort to load the page to find its children.

In some implementations, according to the logic of the data store, a node cannot be on both the left and right sides of the hole locations table 1300. In other words, the following cannot happen: a node is both known to have a hole (right side) and to be a hole for another node (left side). Therefore, when the data store walks the list and finds that nodes in it are complete, the data store does not have to recurse and look for lists associated with them in the table.

Other tasks may have to be performed when a node is discovered to be complete. In particular, when a node on a page is discovered to be complete, the digest is written out to the page's complete nodes journal 136. If this is known to be the last such node on a page, the page's header file may be modified to reflect that all of its nodes are complete and its complete node journal is deleted. The data store may also go through the external references list and note that the nodes on the external references list are all complete.

For pending nodes, when they are found to be complete, they are moved to the appropriate tables for writing out onto pages of complete nodes, as discussed above. Since there may be multiple threads discovering new nodes, loading pages, and the like, the process of adding a node/hole pair to the hole locations table 1300 (and modifying the lists in the table 1300) and the process of removing a node from the table as a hole occur within critical regions of the system; in other words, only one thread of control may be allowed to perform these operations at a time.

IV. Index

In accordance with some embodiments, an index is provided, both in persistent storage, as well as in temporary storage. The index identifies which data group (e.g., page) a node corresponding to a particular digest is part of. The index maps digests of chunks to pages containing information for recreating the chunks. Providing the index as a single large file in persistent storage, where the large file has an array of page numbers indexed by digests, may not be efficient. Although such a large file will allow the data store to determine whether a node for a particular digest exists by allowing the data store to seek to an appropriate location in the file, read the corresponding page number, and provide that number (or an indication of the node's absence) as the answer, accessing the large file in persistent storage suffers from two issues: (1) performing a seek in persistent storage, such as disk, involves a relatively large access time (due to the seek time associated with looking up an item in disk, since a disk is optimized for sequential reading); and (2) the index file can be enormous (note that in one example four-byte page numbers and 16-byte digests would result in an index file of roughly a trillion, trillion terabytes, regardless of the size of the data store).

To overcome the above issues, the data store can take advantage of the fact that in a good cryptographic digest, the bits of the digest are essentially independent of one another, so that the first k bits (or any other subset) of an n-bit digest also would provide a (slightly less) good digest. Thus, according to some embodiments, a subset of the digest bits are used, with some mechanism added to deal with collisions that may occasionally happen. The actual size of the subset of the digest bits that is used can be set using a configuration parameter that is chosen based on an expected number of nodes in the data store and the size of available temporary storage (e.g., memory).

Figures 16, 17:
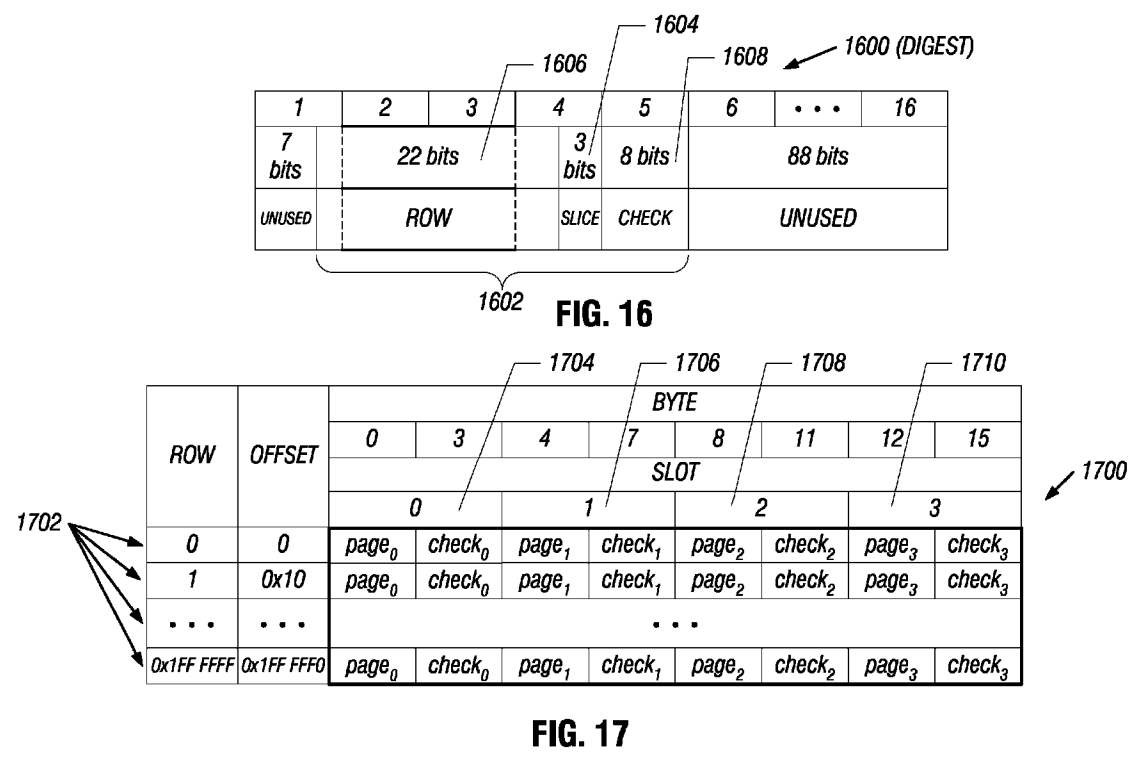

In one example, it is assumed that a digest has 16 bytes (128 bits). In one specific embodiment, as depicted in FIG. 16, a portion (which is 33 bits in the depicted example) of the 16-byte digest 1600 is used as the subset (1602). In the subset 1602, one sub-portion 1604 is used for identifying the index slice (134 on disk 110, as depicted in FIG. 1) that will contain the index entry for the node corresponding to a particular digest (if the node is in the data store). As depicted in FIG. 1, the index on disk 110 is separated into multiple index slice files 134. The sub-portion 1604 of the subset 1602 of the digest is used to identify one of the index slice files 134.

Each index slice file 134 contains multiple rows. A second sub-portion 1606 of the digest subset 1602 is used for identifying a row from among the rows in the index slice file. In addition, each row is divided into one or more slots. A third sub-portion 1608 of the digest subset 1602 is used for identifying one of the slots in the row. In the example of FIG. 16, the remaining 95 bits of the digest remain unused.

The number of index slices 134 used in the data store depends on how much time a data store is willing to spend in reading or writing the slice (that is, how much time it takes to do each slice write). The amount of time taken to write the totality of the index will be roughly the same regardless of the number of slices. If eight slices are defined, then each slice has close to $1/8^{th}$ of the number of entries for nodes contained in the data store. The 3-bit portion 1604 of the digest is used to select one of these eight index slice files.

In the example of FIG. 16, the first four bytes (bytes 1-4) of the index are used for identifying a slice and a row within the slice. In other implementations, other ways of identifying digest bits to make up the three fields (slice, row, check block) can be used, depending on the type of digest used and other implementation details. In the specific example, the lower-order bits (the 25 lower-order bits in the depicted example) of the four bytes are used as the row and slice identifiers. The highest-order 7 bits in byte 1 are not used in the example. In fact, the lowest-order three bits are used as the slice identifier. Selecting the lower-order bits from the first four bytes of the digest reduces the number of shifts (of numbers representing these index portions) that may have to be performed and also makes it more likely that there will be more signal if the digest is not in fact a cryptographic digest. If the digest is not a cryptographic digest, then it is more likely that the higher-order bits will be all 0s than the lower-order bits. For similar reasons, the slice identifier is taken from the lowest-order bits of the first four bytes to make it more likely that nodes will be evenly distributed among slices.

In one implementation, each row contains a fixed number of slots, and each slot contains a page number and a check block. FIG. 17 shows an example slice file 1700. The slice file 1700 has a number of rows 1702, where each row in the example has four slots 1704, 1706, 1708, and 1710. The row column and offset column depicted in the example of FIG. 17 are not actually present in the file, but are provided for purposes of illustration. The row column represents the row number within the slice file 1700, and the offset column indicates the offset into the slice file for each corresponding row.

As indicated in the example of FIG. 17, each slot has a page number (e.g., $page_0$, $page_1$, $page_2$, $page_3$) and associated check block (e.g., $check_0$, $check_1$, $check_2$, and $check_3$). Note that the content of the check block in each slot is taken from the sub-portion 1608 of the digest in FIG. 16. The check block is used to identify which of the slots a particular digest subset 1602 maps to.

The check block is present in each slot of the index file because the data store is using just a subset of the digest to perform indexing. For a given digest, the sub-portion 1604 is used to map to a particular index slice file, and the sub-portion 1606 is used to map to a particular row within the index slice file 1700. Then the data store checks the slots within the mapped row to find slots that are filled. The check blocks within the filled slots are compared to the sub-portion 1608 of a received digest (received by the data store as part of a lookup request) to see if there is a match. If a match is found, then the node corresponding to the particular slot is considered to be a match for the given digest. The check block helps in reducing the likelihood of collisions without adding too many rows to a slice file.

A simplified process of looking up a digest is described below in connection with FIGS. 18A-18B. This simplified process is improved upon with a modified process further below. As depicted in FIG. 18A, a given digest is received (at 1802). The digest is received by either (1) being given a node and obtaining the digest from the node; or (2) being given the digest directly which results in a lookup for the corresponding node in the node cache 122. Note that the process of FIG. 18A occurs when the data store is trying to resolve a node whose location is "unknown." The node is retrieved so that the data store can set the node to "missing" or to determine whether the location of the node has changed. Next, the appropriate slice file is referenced (using sub-portion 1604 of the digest), and a seek is made (at 1804) to the appropriate row (by multiplying the row number given by sub-portion 1606 of the digest by the row size), and the row is read. The slots in that row are examined (at 1806) in sequence until: (1) one is found with a page number of zero (or some other indication that there are no more valid entries in that row) or the end of the row is encountered, in either of which cases, the data store can be sure that the requested node does not exist in the data store (note that as discussed in further detail this may not be true in all scenarios); or (2) a slot is found with a check block that matches sub-portion 1608 extracted from the received digest.

If the data store does not find a slot with a matching block, case (1), as determined at 1808, then the node is indicated (at 1810) as "missing" (not present in the data store). On the other hand, in the latter case (2), the data store can be sure that if the node exists in the data store, the node is on the page referred to by the slot (although this may not be true if there has been a collision). However, it might also simply be the case that there is another node in the data store whose digest has a subset 1602 that is equal to the subset 1602 for the given digest that the data store is looking up. The data store checks (at 1812) to see whether the referred page is currently loaded in memory 112. If the referred page is loaded in memory, then the data store must have received a false positive, since if the node the data store was looking for was on a loaded page (124 in FIG. 1), the node cache 122 (FIG. 1) would have indicated that status, so if the node indicates that the location is "unknown," then the node is not there and so the node is not in the data store at all. The node corresponding to the given digest can be set (at 1814) to "missing."

However, if the page is not loaded, as determined at 1812, the data store will load (at 1816) the page. If the node is on the page, as a side-effect of loading the page, the node's location will change from "unknown" to "on page" (the loaded page). If, on the other hand, the node is not on the page, loading the page will have no effect on the node, and its location will remain "unknown". If the data store determines (at 1818) that the node did not changed from "unknown" to "on page," then the data store knows that the positive was a false positive, and the node can be set (at 1820) to "missing." The just loaded page can be marked so that the page is likely to be the next to be unloaded, unless something else causes the page to be marked as active. However, if the data store determines (at 1818) that the node did change from "unknown" to "on page," then the process returns a true indication (note that if the node is missing the query will return a false indication).

When a new page is written to disk, the process is essentially reversed as depicted in FIG. 18B. For each node on the page, the digest is checked, and the appropriate slice file is accessed. The data store seeks (at 1830) to the correct row and reads the row. The data store then checks (at 1832) to make sure that no entry with the current node's check block is present, and then the first empty slot in the row with the node's page and check block is filled (at 1834). Finally, the data store seeks back (at 1836) to the beginning of the row and writes the updated row back to the slice file.

With the simplified procedure outlined above, two issues may be raised. In certain scenarios, when updating an index slice file, there may already be a slot having the same check block value. Moreover, in other scenarios, the row may be completely filled so that no unused slot is available in the index slice file row for the new node.

To handle the issue of a slot already containing a matching check block, the index can maintain a collision table 142 (in memory 112, as depicted in FIG. 1) that includes a simple list of nodes. Note that a consideration in choosing the size of the subset of the digest used is that, when combined with the number of nodes in the data store, the size of the subset will determine how much memory can be expected to be used by the collision table. Whenever a new page is written and it is detected that a node (referred to as "new node") on that page has a digest equal, down to check block, with a node already in the index, the new node is added to the collision table 142 and an entry including the digest and page number of the new node are journaled to an overflow/collision journal 140 on the disk 110. More generally, a "collision data structure" refers to either the in-memory collision table 142 or the on-disk collision journal 140, or both.

Whenever the data store starts up (such as after a crash or power cycle), the overflow/collision journal 140 is read, and for any collisions in the journal 140 (in other words, for any nodes listed in the collision journal 140), a new node is created with data saying that the node is unloaded on the correct page (just as if the page had been loaded and then unloaded), and the node is added to the list of the collision table 142 in memory 112. Since these nodes in the collision table 142 will be in memory 112 (being held by the collision table 142), they will remain in the node cache, and so a lookup of a digest for a node in the collision table 142 will not return "unknown," so the index will not actually be consulted.

To handle the second issue of all slots within a row being filled when a write of node information is attempted to the row of the index slice, the in-memory object representing each index slice contains an overflow table 144. There is one overflow table 144 per index slice. The overflow table 144 is a map from the combination of row number and check block to page number. As with collisions, when a node is to be added to an index slice row and the row is full, an entry is added to the slice's overflow table 144 and the entry is journaled to the overflow/collision journal 140, according to one implementation. In a different implementation, the overflow/collision journal 140 can be separated into two journals, an overflow journal, and a separate collision journal. More generally, an "overflow data structure" refers to either the in-memory overflow table 144 or the on-disk overflow journal 140, or both.

At startup, when the overflow/collision journal 140 is read from disk 110, the overflow tables 144 for the slices are reconstructed in memory 112. The overflow tables 144 are consulted during lookup of a digest. In a lookup of a given digest, if no matching slot is found in the corresponding index slice file row that maps to the digest, and the row has no empty slots, the data store goes to the overflow table 144 associated with the slice. The entry in the overflow table 144 is based on the combination of the row number and check block of the given digest. If a matching entry is found in the overflow table 144, the page number corresponding to the row number and check block in the overflow table 144 is used as the one returned by the index (which is the correct page number if and only if the node already exists in the data store). In other implementations, the overflow tables 144 can sometimes be checked before looking at the row in the index slice file.

A further issue associated with using the simplified procedure of FIGS. 18A-18B is that the simplified procedure may be inefficient in certain scenarios, and may result in more disk seeking and I/O accesses than the data store can afford. An improved procedure is discussed below.

The actual in-memory layout of the index 132 (FIG. 1) is illustrated in FIG. 19. Each index slice is represented by an object (with slice objects 1900A-1900E, depicted in FIG. 19).

The index slice objects 1900A-1900E correspond to the index slice files 134 residing on disk 110. Note that only five slice objects are depicted in FIG. 19; there actually may be more slice objects kept in memory 112 to correspond to the index slice files 134.

Each slice object 1900 (1900A, 1900B, 1900C, 1900D, or 1900E) is associated with a corresponding overflow table 144A, 144B, 144C, 144D, or 144E. To reduce the number of accesses to disk 110, zero or more of the slices (slice objects) 1900 (1900A-1900E) are associated with respective slice caches (1902A, 1902B depicted in FIG. 19). In the example of FIG. 19, slices 1900A and 1900B are associated with the slice caches 1902A and 1902B, whereas slices 1900C, 1900D, and 1900E are not associated with slice caches. The slice caches 1902A and 1902B are permanent caches in that they remain attached to their respective slices (except for temporary detachments to update corresponding index slice files 134). Each slice cache 1902 (1902A or 1902B) is a byte-for-byte copy of the slice file 134 (or at least a portion of the slice file) read from disk 110 during startup of the data store. Alternatively, the slice file 134 can be loaded into the corresponding cache 1902 slightly after the data store begins operation. In this latter case, the data store can start processing requests before the slice caches have all been loaded, with degraded performance until the slice caches 1902A, 1902B are loaded into memory 112. If fewer than all of the slices have associated caches, there is a floating cache 1904 that is attached to the rest of the slices in sequence (in other words, the floating cache 1904 is attached to the slices not associated with caches one at a time in sequence). The floating cache 1904 is not a permanent cache. When the floating cache 1904 is attached to a particular slice, the corresponding slice file 134 is read from disk and loaded into the floating cache 1904.

To reduce or eliminate seeks when updating the on-disk slice files, the on-disk slice files 134 are written as a single sequential operation by writing content of the cache 1902 or 1904 associated with the slice. When the system starts up, the data store loads its content into permanent slice caches 1902A, 1902B for a first number of slices (where the number is based on a configurable parameter), and the data store also loads the content of the floating cache 1904, which is assigned to the first slice in sequence that is not associated with a permanent slice cache. The last updated slice pointer 1908 is updated with each write of a slice file 134 to disk. The last updated slice pointer 1908 starts out pointing to the last slice (the one that will be the last one updated), while the floating cache will be initially attached to the first slice after the last slice with a permanent cache. In the example of FIG. 19, the last updated slice pointer 1908 will start at E while the floating cache 1904 will start at C. Only when the last updated slice pointer points to one of B through D (the last slice with permanent cache through the next-to-last slice) will the floating cache be attached to the slice following the last updated slice. Slice files 134 are written in sequential order with wraparound; in the example shown in FIG. 19 the next slice files 134 written will be in order D (the first slice after the one pointed to by the last updated pointer 1908), E, A, B, C, D, E, and so on.

When a page is written to disk, the nodes on the page are added to the corresponding slices. When a slice has an attached permanent cache 1902 or floating cache 1904, adding nodes to the slice is accomplished by modifying the corresponding row in the cache (or in the collision table 142 or the slice's overflow table 140 if appropriate.) Thus, a cache associated with the slice may be more up-to-date than the actual slice file 134 (maintained on disk 110) until the slice file 134 is updated with the corresponding cache content. If the slice does not have an attached cache when the node is added, an entry is added to the slice's pending adds list 1906 (1906A, 1906B, 1906C, 1906D, or 1906E). The pending adds list 1906 (1906A, 1906B, 1906C, 1906D, or 1906E) has entries that each contain a node and from which may be obtained a corresponding page number. By holding onto the nodes that have not yet been written to disk or reflected in a cache using the pending adds list 1906, the index ensures that these nodes will stay in memory, and therefore, in the node cache 122. As a result, when such nodes are subsequently accessed, the data store will know the page the nodes are on without needing to consult the index.

To update the index slice files 134 on disk, the data store maintains a thread that executes the following tasks for slices, in some type of rotation, when the data store has been idle (relative to requests) for some minimum period of time (or the data store has become less busy based on some busy indicator indicating that loading on a system containing the data store has dropped below some threshold) or when the number of pending adds (reflected in the pending adds list 1906) attached to slices grows too large (e.g., greater than some threshold that can be predefined or configurable by a user). The process of updating the index slice files 134 on disk is depicted in FIG. 20. For a given slice that is to be updated, the slice's cache (permanent cache 1900 or floating cache 1904) in FIG. 19 is detached (at 2002) from the slice. Note that while the cache is detached, queries on the slice will be slower.

Next, the cache associated with the given slice is written out (at 2004) to the corresponding index slice file 134 on disk. The index slice file 134 will now be up-to-date as of the time the slice update operation began. If the write of the cache to the index slice file fails, the cache is re-attached (at 2006) and any pending adds are processed by adding them to the cache. The pending adds list may then be cleared, allowing the nodes to be removed from the node cache 122 if there are no further references to them. Writing of the cache to the index slice file can be attempted again after some predefined period of time.

Once the cache has been successfully written to the corresponding index slice file 134, the last updated slice pointer 1908 is updated (at 2008) to point to the corresponding updated slice. If the slice has a permanent cache 1902, then the cache is re-attached (at 2010) to the slice. Atomically, the re-attached permanent cache is updated (at 2012) to reflect any pending adds that have arrived since the last time the permanent cache was attached, and these pending adds are removed from the slice's pending adds list.

If the cache associated with the updated slice is the floating cache 1904, then the next slice (which can be circularly selected in sequence) that does not have its own permanent cache is selected (at 2014) for attachment to the floating cache 1904, the corresponding slice file 134 is read into the floating cache 1904, and the pending adds from the new slice are added to the floating cache 1904 and removed from the new slice's pending adds list.

An issue arises if the data store crashes before the index slice files 134 on disk have been fully updated. To address this issue, when a page is written, a permanent indication (on disk) notes that the nodes for that page may not all have been written to the index slice files 134. In other words, the on-disk index may not contain information sufficient to identify the page for all of the nodes on the page. The permanent indication can be any type of indication stored on disk, such as an empty file, or a journal entry. When the system restarts, the permanent indications are read and any pages associated with such permanent indications are loaded into memory. When a page that has a state indicated by the permanent indication as not being indexed is loaded, all of the page's nodes are added (possibly again) to the index. Since some of the nodes may be indexed on slices that have been written to disk, the slices are able to determine that the corresponding slice file already has the information that the respective slice is being asked to add by noting that an entry exists in the correct row and with the correct check block and referring to the correct page.

When the page is written, the page is added to a list of pages 1910 (1910A, 1910B, 1910C, 1910D, or 1910E) associated with the last updated slice, as indicated by the last updated slice pointer 1908. The next time this slice is written out, the data store can be sure that all the nodes for that page are reflected in the on-disk index (in the index slice files 134), since every slice has been written out once since then. Thus, whenever a slice is written to disk, before updating the last updated slice pointer 1908 to point to such updated slice, the on-disk permanent indications that indexing is required are removed or reversed (or at least scheduled to be removed or reversed) for the pages on the associated list of pages 1910, and the list of pages 1910 associated with the just updated slice is cleared. In other embodiments, other mechanisms or techniques may be employed to ensure that the on-disk permanent indications are removed or reversed at some point after each of the slices have been updated at least once following the creation of the indication.

For a subset of the slices 1900 (those with attached permanent caches), which in FIG. 19 include slices 1900A and 1900B, the data store does not have to go to disk to identify a page associated with a node in the data store or to determine that the node is not in the data store. The data store can just access the attached slice caches 1902 to make the determination. However, for some or all of the remainder of the slices (not attached to permanent caches), a Bloom filter (1912C and 1912D illustrated in FIG. 19) can be associated with such slices to allow the data store to determine (most of the time) that a slice does not have a node if, in fact, that is the case. Note that in the example of FIG. 19, the Bloom filters (1912C and 192D) are associated with respective slices 1900C and 1900D. The slice 1900E in the example of FIG. 19 is not associated with a Bloom filter (or a permanent cache 1902).

A Bloom filter is typically much smaller than a slice cache, and has the property that the Bloom filter does not provide false negatives (in other words, the Bloom filter does not say that a node does not exist in the data store when the data store does contain the node). The Bloom filter also has a tunable false positive rate parameter that represents the likelihood of saying "yes" when the node does not exist in the data store (false positive).

A Bloom filter works by taking a large key value k (ideally a hash or something similar with a lot of bitwise independence such as the cryptographic digest used to identify nodes representing chunks) and breaking the large key into a number of smaller keys. The Bloom filter then uses each smaller key as an index into a bit array. An example Bloom filter is illustrated in FIG. 22, where the Bloom filter is made up of a bit array v having m bits. It is assumed that there are n keys derived from k, where the n keys correspond to the cryptographic digests used to identify nodes and representing chunks in the data store. As noted above, each key is broken up into a number of smaller keys, represented as $h_1(k)$, $h_2(k)$, and so forth. The smaller keys are mapped to positions $P_1$, $P_2$, and so forth, in the bit array v, as depicted in FIG. 22.

To add a key to a Bloom filter, the bits associated with each index into the bit array are set to 1. Thus, as depicted in FIG. 22, for a given key k, the bit position in the bit array v pointed to by $P_1$ is set to 1, the bit position in the bit array v pointed to by $P_2$ is set to 1, and so forth. This is repeated for other keys of the data store.

To query whether the Bloom filter contains a given key, each of the indexed bits in the bit array v pointed to by the smaller keys making up the given key k is checked. If all of the indexed bits are 1, then the filter (probably) contains the given key. If at least one of the indexed bits is 0, the filter definitely does not contain the key.

In some implementations, the key is derivable from the row number and check block (1606 and 1608 of the digest in FIG. 16), so that the data store can build the Bloom filter from the slice file itself. Since such a key is smaller than the sort of key that the data store may wish to use, the data store can obtain extra bits by initializing a deterministic pseudo-random number generator with a value obtained by combining the row number and check block. The pseudo-random number generator is then used to generate subsequent smaller values to use as one or more smaller keys. In one implementation, part of the combined value is used as the first smaller key. In some implementations, the successive pseudo-random numbers are combined (e.g., by an exclusive-OR (XOR) operation) with the first smaller key to obtain the successive smaller keys. This is done to prevent a situation in which a collision between numbers generated by pseudo-random number generators seeded with different seeds will result in all subsequent generated smaller keys being identical, which would violate the substantial key independence required by the Bloom filter.

In an alternative implementation, the keys can be built from entire digests of the nodes being indexed.

A Bloom filter 1912 (1912C or 1912D) is updated whenever a node is added to a slice that has a Bloom filter. The Bloom filters may be written out to their own files on disk (and read back at startup) or the Bloom filters may be created from slice caches the first time the caches are read for each slice. In some embodiments, every slice that does not have a cache will have a Bloom filter. However, in other embodiments, at least one slice does not have either a slice cache or a Bloom filter (such as slice 1900E in FIG. 19).

FIG. 21 shows the algorithm for querying whether the data store has a set of nodes. The data store first attempts to resolve (at 2102) each node without going to disk. The details of 2102 are depicted in FIG. 23. Next, the data store attempts to resolve (at 2104) each node by going to disk if necessary. Note that task 2102 is performed for all nodes in the set before task 2104 is performed.

In the procedure 2102, as depicted in FIG. 23, the data store looks up (at 2106) each digest in the node cache 122 (FIG. 1). Note that the procedure of FIG. 23 is performed for each node in the set of 2102. If the data store determines (at 2107) that the node that has been looked up is not an "unknown" node, then the resolution is finished and the procedure 2102 returns. Otherwise, the data store identifies (at 2108) the slice associated with the node (i.e., the slice in whose associated slice file an entry identifying the page for that node would occur) and requests that that slice attempt to determine, without consulting its on-disk slice file, a page the node is possibly on. As a side effect of this determination, the slice may determine that the node is not in the data store. In this case, the slice returns an indication of the fact by changing the node's location to "missing". If a possibly associated page is returned, as determined at 2110, the data store determines (at 2112) whether the page is already loaded. If it is, then the data store determines that the node is not on that page (since if the page is loaded, the node would be associated with the page's "on page" location rather than with "unknown") and changes (at 2114) the node's location to "missing". Otherwise, the data store loads (at 2116) the page. If this load has a side-effect of changing the node's location, as determined at 2118, then the node has been resolved. If the node is still "unknown", then the data store determines that the node is not on that page, and, since that was the only page it could have been on, changes (at 2120) the node's location to "missing" and, optionally, marks the newly-loaded page as being a good candidate to unload the next time the data store needs to unload a page. If the node's location is not changed to "missing" and no possible page is returned, the node is left, for the moment, as "unknown".

Figure 24:
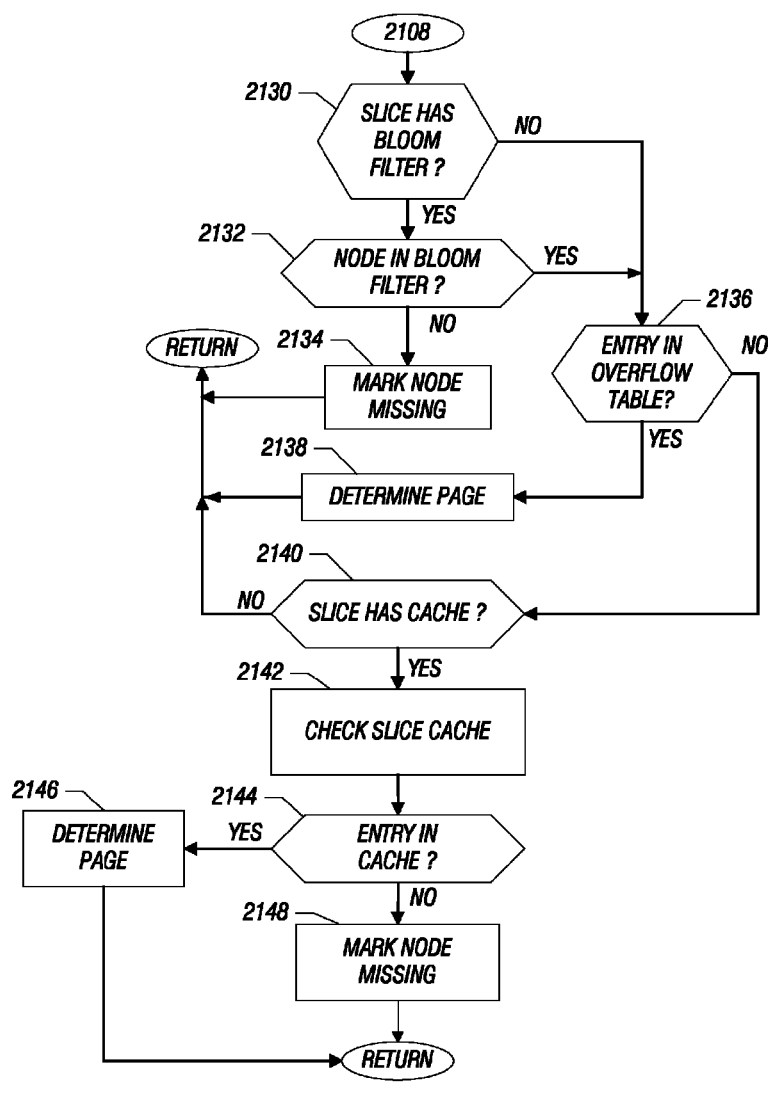

To identify a possible page for a node without using the slice file (as performed at 2108), as depicted in FIG. 24, the data store first checks (at 2130) to see whether the slice is associated with a Bloom filter. If so, the Bloom filter is checked (at 2132) to see if the node is in the Bloom filter, and if the node is not in the Bloom filter, the node is marked (at 2134) as "missing" and the procedure returns without determining a possible page. Next, the data store checks (2136) to see whether there is an entry in the slice's overflow table associated with the node's digest. If there is, the page associated with the entry is determined (at 2138) and returned as the possible page. If there is no entry in the overflow table, as determined at 2136, the data store checks (at 2140) to see whether there is a cache associated with the slice. If there is no cache associated with the slice, the procedure returns without determining a possible page and without altering the node's location. If there is an associated cache, the data store accesses (at 2142) the appropriate row in the cache and looks (at 2144) for an entry with a check block that matches that of the node's digest. If one is found, the associated page is determined (at 2146) and returned as the possible page. If no entry is found, then the node's location is changed (at 2148) to be "missing" and the procedure returns without determining a possible page.

If there is any locality in a query, and there are more nodes being queried than slices, it is likely that at least some of the nodes will be indexed by slices that have caches, and so the correct pages will be loaded, and information for nodes associated with other slices can be obtained. If the nodes are not in the data store, the data store will now know this, except in the case of slices that have neither caches nor Bloom filters, or in the case of Bloom filter false positives. Thus, in response to a first query to determine whether a first node having a first digest is present in the data store, a page may be loaded from disk to memory. Updated information contained in memory as a result of loading the page can then be used to satisfy a second query to determine whether a second node having a second digest in the data store.

The procedure where the slice is asked to resolve an "unknown" node by going to disk (2104 in FIG. 21) involves the slice finding a page by reading rows from the corresponding index slice file. If such a page is found, the page is loaded (if the page was not already loaded). If there is no page or if the node is still unknown after loading the page, the node is set to "missing."

Thus, for any node that is indexed in a slice that has either a cache or a Bloom filter, disk lookups are almost never needed (subject to collisions in the caches or to the false positive rate of a Bloom filter) to decide that the node is not in the data store. For nodes that are in the data store, the index slice file on disk is accessed only if the node is on a page (rather than in a pending set); the page is not already loaded (nor is it the case that the page has been unloaded, but the node is held for some other reason); the node is not indexed in a slice with a cache; the node is not in the slice's overflow table; and no other node in the query is on the same page and either indexed in a slice with a cache or in its slice's overflow table or otherwise held in the node cache and having an unloaded page as its location.

A benefit of using an index according to some embodiments is that the index scales to arbitrarily large data stores. The index can also be made such that the index consults its on-disk image in rare cases when looking up nodes, whether the nodes are in the data store or not. Also, the index amortizes updates to efficiently write out information to its on-disk image (by performing a sequential write of the associated cache content to the corresponding index slice file), while ensuring that crashes of the system will not cause information loss. The index also allows the data store to start almost immediately, regardless of the size of the data store, presenting somewhat degraded performance until the index is fully initialized and loaded into memory.

Other techniques of implementing the index of the data store can be employed in other embodiments. In one alternative embodiment, a single floating cache (and no permanent caches) is used, where the single floating cache (e.g., 1904 in FIG. 19) is sequentially attached to corresponding slices. Providing just a single floating cache may degrade performance on lookups, but perhaps not by too much, since if the number of hits for any given page for a query is more than the number of slices, it can be expected for at least one to be on the page that has the floating cache attached.

In another embodiment, Bloom filters are not used. In yet another embodiment, Bloom filters are provided even on slices that have permanent slice caches.

In yet another embodiment, a single Bloom filter can be used to cover the entire index rather than providing a single Bloom filter per slice. In this implementation, the slice bits (sub-portion 1604 in FIG. 16) could usefully be considered when determining the Bloom filter keys.

Other mechanisms than Bloom filters can be used to accomplish the same task. For example, a simple bitmap with a single bit per row can answer the question "does this row contain any nodes?," which is similar to what the Bloom filter does. However, the simple bitmap does not take the check block into account, and so may fail more often. Also, the simple bitmap may take up more storage space, as the Bloom filter's size is governed by the number of items expected to be contained in the corresponding slice, while a bitmap's size is governed by the number of rows. A bitmap may be smaller if only some of the row bits (of the row sub-portion 1606 depicted in FIG. 16) are considered. However, the bitmap may be larger, and therefore fail less often, by considering some of the check block bits (1608 in FIG. 16) as well. More generally, a "lookup data structure" refers to a data structure (such as the Bloom filter or bitmap referenced above) that deterministically, but not definitively, returns a "yes" or "no" in response to a query regarding whether a node is in the data store.

In yet another embodiment, slice caches and Bloom filters can be eliminated completely, with the data store going to the on-disk index for every query and update. In this approach, performance may be improved by providing the different index slice files on different disks to enable parallel access of different index slice files.

In another embodiment, instead of maintaining the overflow table (144) in memory 112, as depicted in FIG. 1, the overflow table can be kept on disk and can be used as a secondary table rather than a primary table. In other words, whereas the overflow tables 144 kept in memory 112, as discussed further above, are consulted before going to disk (since memory lookups are faster), this alternative embodiment would consider the overflow tables as a fall-back data structure to check only if the main index table (the equivalent concatenation of the slice files 134) had already been consulted.

Each row of the main index table can have a more complicated structure to try to determine, for full rows, whether an entry exists in the overflow table for a given node. The main index table can have a structure similar to the slice files discussed above, with the main index table having rows each containing a sequence of slots, with each slot containing a page number and a check block. However, in this alternative implementation, once a row becomes full, some of the slots can be replaced by other indicator values that can be used to hold information about the check blocks of further nodes. For example, if the first byte of a page number is negative (where in this example a negative number is an indicator value), the remaining bytes of the slot could be used to hold the check blocks of further nodes (the number of such nodes being given by the negative of the page number byte).

The following is an example of a full row, where the example uses 3-byte page numbers and 1-byte check blocks.

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| $page_1$ | | | $cb_1$ | $page_2$ | | | $cb_2$ | $page_3$ | | | $cb_3$ | $page_4$ | | | $cb_4$ |

In the example above, four slots containing four respective page numbers ($page_1$, $page_2$, $page_3$, $page_4$) and four check blocks ($cb_1$, $cb_2$, $cb_3$, $cb_4$) are provided. If a fifth node is added, the row may become the following:

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| $page_1$ | | | $cb_1$ | $page_2$ | | | $cb_2$ | $page_3$ | | | $cb_3$ | −2 | $cb_4$ | $cb_5$ | |

Note that in the above example, in response to the fifth node being added to an already full row, the fourth slot has been changed to replace reference to the page number $page_4$ to include a −2 value, as well as to include check blocks $cb_4$ and $cb_5$ for the fourth and fifth nodes. The −2 number indicates that there are two nodes added to the corresponding overflow table. With the example above, node 4 can no longer be looked up without going to the overflow table. However, the data store can be sure that anything that is not one of the five nodes (or more properly, anything that does not collide with the check blocks of one of the five nodes) is not in the overflow table.

A sixth node can be added similarly:

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| $page_1$ | | | $cb_1$ | $page_2$ | | | $cb_2$ | $page_3$ | | | $cb_3$ | −3 | $cb_4$ | $cb_5$ | $cb_6$ |

In the above example, the fourth slot now contains a −3 value, as well as the check block $cb_6$ for node 6. The −3 value indicates that there are three nodes provided in the overflow table.

If a seventh node is to be added, a similar approach can be used with another slot in the row, as depicted in the example below:

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| $page_1$ | | | $cb_1$ | $page_2$ | | | $cb_2$ | −2 | $cb_3$ | $cb_7$ | | −3 | $cb_4$ | $cb_5$ | $cb_6$ | n the above example, the third slot has been changed to replace the $page_3$ value with a −2 value to indicate that two nodes are kept in the overflow table. The third slot also contains the check blocks $cb_3$ and $cb_7$ for nodes 3 and 7.

Alternatively, slots 3 and 4 can be treated as a single suffix with long sequence, as depicted below:

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| | page$_1$ | | cb$_1$ | | page$_2$ | | cb$_2$ | −5 | | cb$_3$ | cb$_4$ | cb$_5$ | cb$_6$ | cb$_7$ | |

In this example, slots 3 and 4 have been combined and a −5 value is provided to indicate that there are five nodes kept in the overflow table, and slots 3 and 4 together contain check blocks for nodes 3-7. With the latter approach, the data store can obtain 15 check blocks in a row (with no page numbers), whereas with the former approach, the data store can only obtain 12 check blocks with no pages numbers.

In yet another implementation, to add the seventh node, the row can be modified as follows:

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| z | page$_1$ | | cb$_1$ | | page$_2$ | | cb$_2$ | | page$_3$ | | cb$_3$ | −1 | BF(cb$_4$, cb$_5$, cb$_6$, cb$_7$) | | |

In the above example, in the fourth slot, a mini-Bloom filter has been added, with the −1 value indicating that the last slot is to be treated as a mini-Bloom filter. The mini-Bloom filter in the example above includes a couple of bits indexed by each of the check blocks. The false positive rates may be high by Bloom filter standards, but such false positive rates may be reasonable in this example implementation. If there were enough check blocks, the data store may treat two slots (minus the indicator byte, which is the −1 value) as the Bloom filter.

In yet a further implementation, a single slot per row can be used instead of having multiple slots per row. A page number of 0 indicates that there is no node with that row number. A positive page number indicates that there is exactly one entry, with the given check block, on the indicated page. A page number of −1 indicates that the check block field contains a Bloom filter of check blocks.

The overflow table that can be used to keep the extra nodes can be a linear-probed closed table based on the row number. Each record of the table contains an index and a pointer to a collision record stored in another file.

Instructions of software described above (including the data store software 100 of FIG. 1) are loaded for execution on a processor (such as one or more CPUs 108 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer of providing a data store, comprising:

storing, by the computer, nodes representing respective chunks of files in a predefined structure that defines relationships among the nodes, wherein the files are divided into the chunks;

collecting, by the computer, the nodes into plural groups stored in persistent storage, wherein some of the nodes are collected into a particular one of the groups according to a locality relationship of the some of the nodes, wherein each of the groups has a header portion and a data portion, the data portion containing payload data of respective chunks associated with the corresponding group, and the header portion containing hashes of the chunks associated with the corresponding group, wherein each of the hashes is calculated by applying a hash function on content of a corresponding one of the chunks in the corresponding group;

associating location indications with the nodes, wherein the location indication of a first one of the nodes includes a pending indication to indicate that the first node has not yet been written to one of the groups in the persistent storage, and wherein the location indication of a second one of the nodes includes an indication of a group in the persistent storage that the second node is part of; and loading one or more of the groups from the persistent storage into temporary storage to enable read operations with respect to chunks of files.

2. A method executed by a computer of providing a data store, comprising:

storing, by the computer, nodes representing respective chunks of files in a predefined structure that defines relationships among the nodes, wherein the files are divided into the chunks;

collecting, by the computer, the nodes into plural groups stored in persistent storage, wherein some of the nodes are collected into a particular one of the groups according to a locality relationship of the some of the nodes, wherein each of the groups has a header portion and a data portion, the data portion containing payload data of respective chunks associated with the corresponding group, and the header portion containing hashes of the chunks associated with the corresponding group, wherein each of the hashes is calculated by applying a hash function on content of a corresponding one of the chunks in the corresponding group;

associating location indications with the nodes, wherein the location indication of a first one of the nodes includes a pending indication to indicate that the first node has not yet been written to one of the groups in the persistent storage, and wherein the location indication of a second one of the nodes includes an indication of a group in the persistent storage that the second node is part of;

loading one or more of the groups from the persistent storage into temporary storage to enable read operations with respect to chunks of files; and wherein the groups comprise pages in the persistent storage, wherein loading the one or more of the pages into the temporary storage comprises loading the respective one or more header portions of the one or more pages into the temporary storage without loading the respective one or more data portions, the method further comprising:

defining a criterion regarding a maximum amount of a resource that can be consumed by pages loaded in the temporary storage; and selecting one or more pages to unload from the temporary storage if the maximum amount is exceeded.

3. The method of claim 2, wherein selecting the one or more pages to unload comprises selecting the one or more pages according to recency of activity of the pages.

4. The method of claim 1, wherein storing the nodes representing respective chunks of files in the predefined structure comprises storing the nodes representing respective chunks of files in a hash-based directed acyclic graph structure (HDAG).

5. The method of claim 1, wherein collecting the some of the nodes according to the locality relationship of the some of the nodes into the particular group comprises collecting the some of the nodes into the particular group according to parent, child, and sibling relationships of the some of the nodes.

6. The method of claim 1, wherein collecting the some of the nodes into the particular group further comprises collecting the some of the nodes into the particular group according to a completeness criterion, wherein the completeness criterion causes nodes that have complete children nodes to be loaded into a same group.

7. The method of claim 6, wherein the predefined structure comprises a graph structure of the nodes, the method further comprising:

identifying which of the nodes are complete, wherein a given node is complete if the given node roots a subgraph in the graph structure where all nodes of the subgraph are present in the data store.

8. The method of claim 7, wherein at least some of the groups contain just complete nodes and at least one other of the groups contains incomplete nodes that are not complete, the method further comprising:

associating a data structure with the at least one other group to indicate nodes of the at least one other group that are later discovered to be complete.

9. The method of claim 1, further comprising:

storing a node cache in temporary storage, wherein the node cache provides a map from digests representing corresponding chunks to respective nodes, wherein each of the digests contains a respective one of the hashes of the corresponding chunk.

10. The method of claim 1, wherein the location indications associated with corresponding other ones of the nodes include:

a pending indication, to indicate that the corresponding node has not yet been written to a group in the persistent storage;

a missing indication, to indicate that a digest associated with the corresponding node is known not to exist in the data store, wherein the digest includes the hash of the corresponding node;

an unknown indication, to indicate that the data store does not know whether the corresponding node is in a group or missing;

a banned indication, to indicate that the corresponding node is not allowed to be in the data store; and an indication of a group in the persistent storage that the corresponding node is part of.

11. The method of claim 10, further comprising:

determining that the particular node is missing in the data store; and associating the particular node with a missing location.

12. The method of claim 1, further comprising:

receiving a request from a client to store a particular chunk;

determining a digest of the particular chunk by applying the hash function on content of the particular chunk;

determining if a node corresponding to the digest of the particular chunk is in the data store; and in response to determining that a node corresponding to the digest of the particular chunk is not in the data store, adding the node corresponding to the digest of the particular chunk to a pending set.

13. The method of claim 1, further comprising:

receiving a query request from a client regarding whether the data store contains a complete graph rooted at a particular node, wherein the complete graph includes a graph without missing nodes, and wherein the query request contains a digest of the particular node; and responding to the query request with an indication of whether or not the data store contains the complete graph rooted at the particular node.

14. The method of claim 1, wherein the header portion of the particular group further contains hashes referencing nodes not part of the particular group that have a predefined relationship to at least one of the nodes in the particular group.

15. A method executed by a data storage system to provide a data store, comprising:

providing, in the data store, a graph structure that specifies relationships among nodes representing chunks of files, the nodes containing digests of the chunks, wherein plural chunks make up a particular one of the files;

collecting, by at least one processor, some of the nodes into pages stored in persistent storage, wherein a particular one of the pages has a header portion and a data portion, the data portion containing payload data of respective chunks associated with the particular page, and the header portion containing first references to nodes in the particular page and second references to nodes that are not part of the particular page but are children of at least one node of the particular page, wherein collecting the some of the nodes into pages is according to a first algorithm that:
- searches for a larger one of subgraphs of nodes that have not yet been written to a given page; and
- writes at least some of the nodes of the larger one of the subgraphs to the given page.

16. The method of claim 15, further comprising:
receiving, from a requester, a chunk that represents a portion of a file;
computing a digest of the received chunk by applying a hash function on content of the received chunk;
determining whether a node corresponding to the digest is present in the data store; and
in response to determining that the node corresponding to the digest is not present in the data store, performing a procedure to add the node corresponding to the digest to the data store.

17. The method of claim 15, further comprising:
delaying performance of the first algorithm until the data store is in a less busy state; and
before performing the first algorithm, performing a second algorithm to write nodes to pages, wherein the second algorithm provides a different level of locality than the first algorithm.

18. The method of claim 15, wherein the first references and second references comprise respective digests computed based on applying a hash function to content of respective chunks.

19. A computer-readable storage medium storing instructions that when executed cause a computer to:
store nodes representing respective chunks of files in a predefined structure that defines relationships among the nodes, wherein the files are divided into the chunks;
collect the nodes into plural pages stored in persistent storage, wherein some of the nodes are collected into a particular one of the pages according to a locality relationship of the some of the nodes, wherein each of the pages has a header portion and a data portion, the data portion containing payload data of respective chunks associated with the corresponding page, and the header portion containing hashes of the chunks associated with the corresponding page, wherein each of the hashes is calculated by applying a hash function on content of a corresponding one of the chunks in the corresponding page;
associate location indications with the nodes, wherein the location indication of a first one of the nodes includes a pending indication to indicate that the first node has not yet been written to one of the pages in the persistent storage, and wherein the location indication of a second one of the nodes includes an indication of a page in the persistent storage that the second node is part of; and
load one or more of the groups from the persistent storage into temporary storage to enable read operations with respect to chunks of files.

* * * * *